US007132476B2

(12) United States Patent
Coca et al.

(10) Patent No.: US 7,132,476 B2
(45) Date of Patent: Nov. 7, 2006

(54) THERMOSETTING COMPOSITIONS CONTAINING ALTERNATING COPOLYMERS OF ISOBUTYLENE TYPE MONOMERS

(75) Inventors: Simion Coca, Pittsburgh, PA (US); Edward R. Coleridge, Lower Burrell, PA (US); Gregory J. McCollum, Gibsonia, PA (US); James B. O'Dwyer, Valencia, PA (US); James E. Poole, Gibsonia, PA (US); Victoria A. Trettel, Freeport, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 266 days.

(21) Appl. No.: 10/887,682

(22) Filed: Jul. 9, 2004

(65) Prior Publication Data

US 2004/0242777 A1 Dec. 2, 2004

Related U.S. Application Data

(62) Division of application No. 10/077,645, filed on Feb. 15, 2002, now Pat. No. 6,784,248.

(51) Int. Cl.
C08F 8/00 (2006.01)

(52) U.S. Cl. ............ 525/107; 525/110; 525/123; 525/124; 525/127; 525/130; 525/327.3; 525/328.8; 525/329.2; 525/330.5; 525/374; 525/380; 525/384; 525/386

(58) Field of Classification Search ............ 525/107, 525/110, 123, 124, 127, 130, 327.3, 328.8, 525/329.2, 330.5, 374, 380, 384, 386
See application file for complete search history.

(56) References Cited

U.S. PATENT DOCUMENTS

| | | | |
|---|---|---|---|
| 2,378,629 A | 6/1945 | Hanford | 260/78 |
| 2,411,599 A | 11/1946 | Sparks et al. | 204/162 |
| 2,531,196 A | 11/1950 | Brubaker et al. | 260/85.5 |
| 3,919,183 A | 11/1975 | Jager et al. | 526/245 |
| 3,947,338 A | 3/1976 | Jerabek et al. | 204/181 |
| 3,984,299 A | 10/1976 | Jerabek | 204/181 |
| 4,147,679 A | 4/1979 | Scriven et al. | 260/29.2 TN |
| 4,147,688 A | 4/1979 | Makhlouf et al. | 260/33.6 EP |
| 4,220,679 A | 9/1980 | Backhouse | 427/401 |
| 4,303,581 A | 12/1981 | Levine et al. | 260/18 PF |
| 4,403,003 A | 9/1983 | Backhouse | 427/407.1 |
| 4,468,307 A | 8/1984 | Wismer et al. | 204/181 C |
| 4,487,860 A | 12/1984 | Winner et al. | 523/408 |
| 4,493,056 A | 1/1985 | Mao | 365/149 |
| 4,877,837 A | 10/1989 | Reising et al. | 525/100 |
| 4,889,890 A | 12/1989 | Kerr et al. | 525/113 |
| 4,937,288 A | 6/1990 | Pettit, Jr. et al. | 525/176 |
| 4,968,751 A | 11/1990 | Miles et al. | 525/100 |
| 4,997,900 A | 3/1991 | Brinkman | 528/45 |
| 5,025,085 A | 6/1991 | Piedrahita et al. | 528/230 |
| 5,071,904 A | 12/1991 | Martin et al. | 524/458 |
| 5,096,556 A | 3/1992 | Corrigan et al. | 204/181.7 |
| 5,098,955 A | 3/1992 | Pettit, Jr. | 525/194 |
| 5,115,083 A | 5/1992 | Piedrahita et al. | 528/230 |
| 5,182,355 A | 1/1993 | Martz et al. | 528/75 |
| 5,202,382 A | 4/1993 | Pettit, Jr. | 525/108 |
| 5,214,101 A | 5/1993 | Pettit, Jr. et al. | 525/176 |
| 5,239,012 A | 8/1993 | McEntire et al. | 525/327.7 |
| 5,270,391 A | 12/1993 | Miyazaki et al. | 525/194 |
| 5,356,973 A | 10/1994 | Taljan et al. | 524/314 |
| 5,407,707 A | 4/1995 | Simeone et al. | 427/410 |
| 5,439,896 A | 8/1995 | Ito et al. | 525/107 |
| 5,508,337 A | 4/1996 | Wamprecht et al. | 524/507 |
| 5,510,444 A | 4/1996 | Halpaap et al. | 528/45 |
| 5,552,487 A | 9/1996 | Clark et al. | 525/131 |
| 5,554,692 A | 9/1996 | Ross | 525/124 |
| 5,663,240 A | 9/1997 | Simeone et al. | 525/327.3 |
| 5,710,214 A | 1/1998 | Chou et al. | 525/124 |
| 5,777,061 A | 7/1998 | Yonek et al. | 528/45 |
| 5,807,937 A | 9/1998 | Matyjaszewski et al. | 526/135 |
| 5,820,987 A | 10/1998 | Kaufman et al. | 428/413 |
| 5,976,701 A | 11/1999 | Barancyk et al. | 428/432.1 |
| 5,989,642 A | 11/1999 | Singer et al. | 427/407.1 |
| 6,111,001 A | 8/2000 | Barancyk et al. | 524/211 |

(Continued)

FOREIGN PATENT DOCUMENTS

GB 1213171 11/1970

(Continued)

OTHER PUBLICATIONS

Greenley, "Q and e Values for Free Radical Copolymerizations of Vinyl Monomers and Telogens," *Polymer Handbook*, Fourth Edition, John Wiley & Sons, Inc., pp. 309-319, 1999.

(Continued)

*Primary Examiner*—Bernard Lipman
(74) *Attorney, Agent, or Firm*—William J. Uhl

(57) ABSTRACT

A thermosetting composition that includes an ungelled copolymer composition and a crosslinking agent. The ungelled copolymer composition includes a functional group-containing copolymer that includes segments of alternating residues derived from a donor monomer composition comprising an acceptor monomer composition. The donor monomer composition includes one or both of isobutylene and diisobutylene, and the acceptor monomer composition includes acrylic monomers and monomers containing functional groups. The ungelled copolymer composition is substantially free of transition metals and Lewis acids, and the copolymer is substantially free of maleate-type monomer residues and fumarate-type monomer residues. The crosslinking agent has at least two functional groups that are reactive with the functional groups of the copolymer. The thermosetting composition may be in liquid, powder, or dispersed form and may be applied by traditional or electrocoating methods.

8 Claims, No Drawings

U.S. PATENT DOCUMENTS

| | | | | |
|---|---|---|---|---|
| 6,114,489 | A | 9/2000 | Vicari et al. | 528/84 |
| 6,191,225 | B1 | 2/2001 | Barkac et al. | 525/208 |
| 6,197,883 | B1 | 3/2001 | Schimmel et al. | 525/111 |
| 6,277,917 | B1 | 8/2001 | Jurgetz et al. | 525/125 |
| 6,281,272 | B1 | 8/2001 | Baldy et al. | 523/501 |
| 6,306,965 | B1 | 10/2001 | Anderson et al. | 525/100 |
| 6,319,987 | B1 | 11/2001 | White et al. | 525/92 K |
| 6,348,554 | B1 | 2/2002 | Roos et al. | 526/319 |
| 6,355,729 | B1 | 3/2002 | McCollum et al. | 525/123 |
| 6,365,666 | B1 | 4/2002 | McCollum et al. | 524/548 |
| 6,479,109 | B1 | 11/2002 | McCollum et al. | 427/458 |
| 6,509,407 | B1 | 1/2003 | McCollum et al. | 524/507 |
| 6,517,905 | B1 | 2/2003 | White et al. | 427/385.5 |
| 6,677,422 | B1 * | 1/2004 | Coca et al. | 526/348.7 |
| 6,686,432 | B1 * | 2/2004 | Coca et al. | 526/348.7 |
| 6,784,247 | B1 * | 8/2004 | Rechenberg et al. | 525/106 |
| 6,787,597 | B1 * | 9/2004 | Martin et al. | 524/522 |
| 6,803,413 | B1 * | 10/2004 | Martin et al. | 525/110 |
| 6,803,426 | B1 * | 10/2004 | Coleridge et al. | 525/326.3 |
| 6,992,137 | B1 * | 1/2006 | Coca et al. | 525/130 |
| 7,019,041 | B1 * | 3/2006 | Coleridge et al. | 522/44 |

FOREIGN PATENT DOCUMENTS

| | | |
|---|---|---|
| GB | 1339981 | 12/1973 |

OTHER PUBLICATIONS

Odian, "Chain Copolymerization," *Principles of Polymerization*, Third Edition, John Wiley & Sons, Inc., pp. 452-491, 1991.

Cowie, Alternating Copolymers, Plenum Press, pp. 1-137, 1985.

Rzaev et al., "Complex-Radical Copolymerization of 2,4,4-Trimethylpentene-1 with Maleic Anhydride," *Eur. Polym. J.*, vol. 34, No. 7, pp. 981-985, 1998.

Mashita et al., "Alternating Copolymerization of Isobutylene and Acrylic Ester with Alkylboron Halide," *Polymer*, vol. 36, No. 15, pp. 2973-2982, 1995.

Mashita et al., "Alternating Copolymers of Isobutylene and Acrylic Ester by Complexed Copolymerization," *Polymer*, vol. 36, No. 15, pp. 2983-2988, 1995.

Kuntz et al., "Poly [2,2-Dimethyl-4-(methoxylcarbonyl)butylene] : Synthesis with an Ethylaluminum Sesquichloride-Peroxide Initiator and NMR Characterization," *J. of Polymer Science: Polymer Chemistry Edition*, vol. 16, pp. 1747-1753, 1978.

Hirooka et al., "Complexed Copolymerization of Vinyl Compounds with Alkylaluminum Halides," *Journal of Polymer Science: Polymer Chemistry Edition*, vol. 11, pp. 1281-1306, 1973.

ASTM D-1200—94, "Standard Test Method for Viscosity by Ford Viscosity Cup," *Amer. Soc. Test. Mat.*, pp. 103-105, 1994.

ASTM D-2369—92, "Standard Test Method for Volatile Content of Coatings," *Amer. Soc. Test. Mat.*, pp. 46-48, 1992.

ASTM D-3359—97, "Standard Test Methods for Measuring Adhesion by Tape Test," *Amer. Soc. Test. Mat.*, pp. 1-7, 1998.

ASTM D-4370—84, "Standard Test Methods for Acid and Base Milliequivalent Content of Electrocoat Bath," *Amer. Soc. Test. Mat.*, pp.780-782, 1984.

"Reference Method 24: Determination of Volatile Matter Content, Water Content, Density, Volume Solids, and Weight Solids of Surface Coatings," *Federal Register*, EPA Reference Methods 24 and 24 A, vol. 57, No. 133, pp. 125-127, 1992.

* cited by examiner

THERMOSETTING COMPOSITIONS CONTAINING ALTERNATING COPOLYMERS OF ISOBUTYLENE TYPE MONOMERS

This is a division of application Ser. No. 10/077,645, filed Feb. 15, 2002 now U.S. Pat. No. 6,784,248.

BACKGROUND OF THE INVENTION

1. Field of the Invention

The present invention relates generally to thermosetting compositions that contain copolymers of vinyl monomers. More specifically, the present invention is directed to thermosetting compositions that contain functional copolymers containing isobutylene type monomers.

2. Description of Related Art

Reducing the environmental impact of coating compositions, in particular that associated with emissions into the air of volatile organics during their use, has been an area of ongoing investigation and development in recent years. Accordingly, interest in high solids liquid and powder coatings has been increasing due, in part, to their inherently low volatile organic content (VOC), which significantly reduces air emissions during the application process. While both thermoplastic and thermoset coating compositions are commercially available, thermoset coatings are typically more desirable because of their superior physical properties, e.g., hardness and solvent resistance.

Low VOC coatings are particularly desirable in the automotive original equipment manufacture (OEM) market due to the relatively large volume of coatings that are used. However, in addition to the requirement of low VOC levels, automotive manufacturers have very strict performance requirements of the coatings that are used. For example, automotive OEM clear top coats are typically required to have a combination of good exterior durability, acid etch and water spot resistance, and excellent gloss and appearance. While liquid top coats containing, for example, capped polyisocyanate and polyol components, can provide such properties, they have the undesirable drawback of higher VOC levels relative to higher solids liquid coatings or powder coatings, which have essentially zero VOC levels.

Coating compositions containing polyol and capped polyisocyanate components, ("isocyanate cured coatings") are known and have been developed for use in a number of applications, such as industrial and automotive OEM topcoats. Such isocyanate cured coating compositions are described in, for example, U.S. Pat. Nos. 4,997,900, 5,439,896, 5,508,337, 5,554,692, and 5,777,061. However, their use has been limited due to deficiencies in, for example, flow, appearance and storage stability. Isocyanate cured coating compositions typically include a crosslinker having two or more capped isocyanate groups, e.g., a trimer of 1-isocyanato-3,3,5-trimethyl-5-isocyanatomethylcyclohexane capped with e-caprolactam, and a hydroxy functional polymer, e.g., an acrylic copolymer prepared in part from a hydroxyalkyl acrylate and/or methacrylate.

Electrodeposition as a coating application method involves deposition of a film-forming composition onto a conductive substrate under the influence of an applied electrical potential. Electrodeposition has become increasingly important in the coatings industry because, by comparison with non-electrophoretic coating means, electrodeposition offers increased paint utilization, improved corrosion protection, and low environmental contamination.

Initially, electrodeposition was conducted with the workpiece being coated serving as the anode. This was familiarly referred to as anionic electrodeposition. However, in 1972, cationic electrodeposition was introduced commercially. Since that time, cationic electrodeposition has steadily gained in popularity and today is by far the most prevalent method of electrodeposition. Throughout the world, more than 80 percent of all motor vehicles produced are given a primer coating by cationic electrodeposition.

Electrodepositable coating compositions comprising active hydrogen-containing polymers which contain onium salt groups are known and have been developed for use, inter alia, in electrodepositable automotive OEM primer coatings. Such electrodepositable coating compositions typically comprise a crosslinking agent having at least two functional groups that are reactive with active hydrogen groups, and an active hydrogen-containing polymer which contains onium salt groups.

Functional polymers used in liquid, powder, and electrodepositable coating compositions are typically random copolymers that include functional group-containing acrylic and/or methacrylic monomers. Such a functional copolymer will contain a mixture of polymer molecules having varying individual functional equivalent weights and polymer chain structures. In such a copolymer, the functional groups are located randomly along the polymer chain. Moreover, the number of functional groups is not, divided equally among the polymer molecules, such that some polymer molecules may actually be free of functionality.

In a thermosetting composition, the formation of a three-dimensional crosslinked network is dependent on the functional equivalent weight as well as the architecture of the individual polymer molecules that comprise it. Polymer molecules having little or no reactive functionality (or having functional groups that are unlikely to participate in crosslinking reactions due to their locations along the polymer chain) will contribute little or nothing to the formation of the three-dimensional crosslinked network, resulting in decreased crosslink density and less than optimum physical properties of the finally formed thermoset coating.

Many patents express the potential for using isobutylene-containing polymers in coating compositions. For example, U.S. Pat. No. 6,114,489 to Vicari et al. discloses a coating composition that includes a functional acrylic resin binder; a co-reactant capable of reacting with the functionality of the acrylic binder; a degasser; and a hyperbranched polyester flow and leveling agent. Isobutylene is suggested as a potential co-monomer for use in the acrylic binder as part of a long list of monomers. U.S. Pat. No. 5,552,487 to Clark et al. discloses powder coating compositions that include a copolymer having a reactive functionality and a suitable crosslinking agent capable of reaction with the reactive functionality of the copolymer. The copolymer is a made by copolymerizing functional monomers with other monomers, isobutylene being one among many listed as potential co-monomers. Although only two are referenced herein, of the many patents that express the possibility of using isobutylene-type co-monomers, none actually shows or discloses a working example of such a copolymer.

The fact that no examples of isobutylene-type; monomer-containing copolymers in coating compositions can be found is most likely due to the generally non-reactive nature of isobutylene with acrylic and methacrylic monomers. Reactivity ratios for monomers can be calculated using the Alfrey—Price Q-e values (Robert Z. Greenley, Polymer. Handbook, Fourth Edition, Brandrup, Immergut and Gulke, editors, Wiley & Sons, New York, N.Y., pp. 309–319 (1999)). The calculations may be carried out using the formulas I and II:

$$r_1 = (Q_1/Q_2)\exp\{-e_1(e_1-e_2)\} \quad \text{I}$$

$$r_2 = (Q_2/Q_1)\exp\{-e_2(e_2-e_1)\} \quad \text{II}$$

where $r_1$ and $r_2$ are the respective reactivity ratios of monomers 1 and 2, and $Q_1$ and $Q_2$ and e1and $e_2$ are the respective reactivity and polarity values for the respective monomers (Odian, *Principals of Polymerization;* $3^{rd}$ Ed., Wiley-Interscience, New York, N.Y., Chapter 6, pp. 452–467 and 489–491 (1991)). Table 1 shows the calculated reactivity ratios of selected monomers with isobutylene:

TABLE 1

| Monomer | $r_1$ (isobutylene) | $r_2$ |
|---|---|---|
| Methyl acrylate | 0.10 | 13.67 |
| Glycidyl methacrylate | 0.08 | 34.17 |
| Methacrylic acid | 0.09 | 39.71 |

As one skilled in the art of polymer chemistry can appreciate, when $r_1$ is near zero and $r_2$ has a value of 10 or more, monomer 2 is reactive toward both monomers and monomer 1 is reactive toward neither monomer. In other words, it is extremely difficult to prepare copolymers having significant amounts of both monomers. It is not surprising then that no examples can be found of coating compositions that include isobutylene-type monomer-containing copolymers, because the monomers do not tend to copolymerize.

In some cases, it is observed that monomers that do not readily homopolymerize are able to undergo rapid copolymerization reactions with each other. The most typical situation occurs when a strong electron donating monomer is mixed with a strong electron accepting monomer from which a regular alternating copolymer results after free radical initiation. Maleic anhydride is a widely used example of a strong electron accepting monomer. Styrene and vinyl ethers are typical examples of electron donating monomers. Systems, such as maleic anhydride—styrene, are known to form charge transfer complexes, which tend to place the monomers in, alternating sequence prior to initiation. The application of the free radical initiator "ties" the ordered monomers together to form an alternating copolymer (Cowie, Alternating Copolymers, Plenum, New York (1985)).

U.S. Pat. No. 2,378,629 to Hanford and U.S. Pat. No. 4,151,336 to Sackman et al. disclose that even when a moderately electron donating monomer, such as diisobutylene, is copolymerized with a strong electron acceptor monomer, such as maleic anhydride, an alternating copolymer results.

When a moderately electron donating monomer, such as isobutylene, is copolymerized with a moderately electron accepting monomer, such as an acrylic ester, poor incorporation of the electron donating monomer results. For example, free radical copolymerization of isobutylene (IB) and acrylic monomers, has resulted in copolymers that contain at no more than 20–30% of IB and have low molecular weights because of the degradative chain transfer of IB. Examples of such copolymerizations of IB are disclosed by U.S. Pat. No. 2,411,599 to Sparks et al. and U.S. Pat. No. 2,531,196 to Brubaker et al.

Conjugated monomers, such as acrylic esters and acrylonitrile, have been shown to react with monomers such as propylene, isobutylene, and styrenes in the presence of Lewis acids, such as alkylaluminum halides, to give 1:1 alternating copolymers. The alternating copolymers were obtained when the concentration ratio of the Lewis acids to the acrylic esters was 0.9 and the concentration of IB was greater than the concentration of the acrylic esters (Hirooka et al, J. Polym. Sci. Polym. Chem., 111, 1281. (1973)). The metal halides vary the reactivity of the monomers by complexing with them. The electron donor monomer—electron acceptor monomer—metal halide complex leads to alternating copolymers (Mashita et al. Polymer, Vol. 36, No. 15, pp. 2973–2982, (1995)).

Copolymers of IB and methyl acrylate (MA) have also been obtained by using ethyl aluminum sesquichloride and 2-methyl pentanoyl peroxide as an initiating system. The resulting copolymer had an alternating structure, with either low (Kuntz et ai, J. Polym. Sci. Polym. Chem., 16, 1747 (1978)) or high isotacticity in the presence of $EtAlCl_2$ (10 molar % relative to MA). (Florjanczyk et al, Makromol. Chem., 183, 1081 (1982)).

Another method for making IB copolymers with acrylic esters involved alkyl boron halide, which was found to be much more active than alkyl aluminum halides in forming alternating copolymers. The resulting copolymer was an elastomer of high tensile strength and high thermal decomposition temperature with good oil resistance, especially at elevated temperatures (Mashita et al, Polymer, 36, 2983 (1995)).

U.S. Pat. No. 5,807,937 to Matyjaszewski et. al. discloses a method of making alternating copolymers of isobutylene and methyl acrylate using an atom transfer radical polymerization (ATRP) process. The method requires the use of a suitable ATRP initiator, such as 1-phenylethyl bromide, and a suitable transition metal salt, such as CuBr with a ligand, such as 2,2'-bipyridyl to perform the complex redox initiation and propagation steps of the polymerization process.

Copolymers containing relatively high amounts. ($\geq$30 mol %) of IB and acrylic esters have only been attained by free radical polymerization when Lewis acids or ATRP initiation systems have been employed. The polymer that results from such processes requires expensive and time consuming clean up to remove the transition metal salt and/or Lewis acid residues in order to make the polymer commercially useful.

Copolymer compositions that contain Lewis acids and/or transition metals intermingled with the copolymer can have a number of drawbacks when used commercially in coating compositions. First, some Lewis acids and transition metals are toxic and have adverse environmental effects if they are leached from the copolymer: and enter the environment. Second, in coating applications the Lewis acids and transition metals may lead to poor color stability when the coating is exposed to UV light or simply cause the coating to discolor through other reactions or interactions. Further, the Lewis acids and transition metals may react with other ingredients in a coating formulation resulting in undesired properties, such as a shortened shelf-life for a given coating formulation.

It would be desirable to develop thermosetting compositions that comprise functional copolymers having a well-defined polymer chain structure. In particular, alternating copolymers containing isobutylene-type monomers that are substantially free of Lewis acids and transition metals would be desirable. Such compositions would have lower VOC levels due to lower viscosities and a combination of favorable performance properties particularly in coatings applications.

SUMMARY OF THE INVENTION

The present invention is directed to a liquid thermosetting composition that includes an ungelled copolymer composition and a crosslinking agent. The ungelled copolymer, composition includes a functional group-containing copolymer that includes segments of alternating residues derived from a donor monomer composition comprising an acceptor monomer composition. The donor monomer composition includes one or a combination of isobutylene, diisobutylene, dipentene, and isoprenol and the acceptor monomer co position includes acrylic monomers and monomers containing functional groups. The ungelled copolymer composition is substantially free of transition metals and Lewis acids and the copolymer is substantially free of maleate-type monomer residues and fumarate-type monomer residues. The crosslinking agent has at least two functional groups that are reactive with the functional groups of the copolymer.

The present invention is also directed to a, thermosetting composition-that includes a co-reactable solid, particulate mixture of a reactant having at least two functional groups, and a copolymer composition. The copolymer composition includes a functional group-containing copolymer as described above. The copolymer composition is substantially free of transition metals and Lewis acids and the copolymer is substantially free of maleate-type monomer residues and fumarate-type monomer residues. The functional groups of the reactant are different from and reactive with the functional groups of the copolymer.

The present invention is further directed to a thermosetting composition that includes a resinous phase dispersed in an aqueous medium. The resinous phase includes an ungelled copolymer composition and a curing agent. The ungelled copolymer composition includes a functional group-containing copolymer that includes segments of alternating residues derived from a donor monomer composition comprising an acceptor monomer composition. The donor monomer composition includes one or a combination of isobutylene, diisobutylene, dipentene, and isoprenol and the acceptor monomer composition includes acrylic monomers and monomers containing one or more active hydrogen groups and residues from monomers containing salt groups. The copolymer composition is substantially free of transition metals and Lewis acids and the copolymer is substantially free of maleate-type monomer residues and fumarate-type monomer residues. The functional groups of the curing agent are different from and reactive with the active hydrogen groups of the copolymer.

The present invention is still further directed to a method of coating a substrate that includes applying a thermosetting composition to the substrate, coalescing the thermosetting composition to form a substantially continuous film, and curing the thermosetting composition. The thermosetting composition is the liquid thermosetting composition or the solid thermosetting composition described above. The present invention is directed to a substrate coated using the above described method.

The present invention is additionally directed to a method of electrocoating a conductive substrate serving as a cathode in an electrical circuit comprising the cathode and an anode. The cathode and anode are immersed in an aqueous electrocoating composition. The method includes passing electric current between the cathode and the anode to cause deposition of the electrocoating composition on the substrate as a substantially continuous film. The electrocoating composition includes the thermosetting composition that includes a resinous phase dispersed in an aqueous medium described above. The present invention is directed to a substrate coated using the above described method.

The present invention is also additionally directed to a multi-component composite coating composition that, includes a base coat deposited from a pigmented film-forming composition and a transparent top coat applied over the base coat. The top coat may be applied using the above described method of applying the liquid thermosetting composition or the solid thermosetting composition of the present invention. The base coat may be applied using the above-described method of applying the present liquid thermosetting composition, the method of applying the present solid thermosetting composition and/or the present method of electrocoating a conductive substrate. The multi-component composite coating composition may have three coating layers where the first coat may be a primer coat including the present thermosetting composition applied using the present method of electrocoating a conductive substrate, the second coat is a base coat is as described above and the third coat is a top coat as described above.

DETAILED DESCRIPTION OF THE INVENTION

Other than in the operating examples, or where otherwise indicated, all numbers or expressions referring to quantities of ingredients, reaction conditions, etc., used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

As used herein, the term "copolymer composition" is meant to include a synthesized copolymer as well as residues from initiators, catalysts, and other elements attendant to the synthesis of the copolymer, but not covalently incorporated thereto. Such residues and other elements considered as part of the copolymer composition are typically mixed or co-mingled with the copolymer such that they tend to remain with the copolymer when it is transferred between vessels or between solvent or dispersion media.

As used herein, the term "substantially free" is meant to indicate that a material is present as an incidental impurity. In other words, the material is not intentionally added to an indicated composition, but may be present at minor or inconsequential levels because it was carried over as an impurity as part of an intended composition component.

The terms "donor monomer" and "acceptor monomer" are used throughout this application. With regard to the present invention, the term "donor monomer" refers to monomers that have a polymerizable, ethylenically unsaturated group that has relatively high electron density in the ethylenic double bond, and the term "acceptor monomer" refers to monomers that have a polymerizable, ethylenically unsaturated group that has relatively low electron density in the ethylenic double bond. This concept has been quantified to an extent by the Alfrey-Price Q-e scheme (Robert Z. Greenley, Polymer Handbook, Fourth Edition, Brandrup, Immergut and Gulke, editors, Wiley & Sons, New York, N.Y., pp. 309–319(1999)). All e values recited herein are those appearing in the Polymer Handbook unless otherwise indicated.

In the Q-e scheme, Q reflects the reactivity of a monomer and e represents the polarity of a monomer, which indicates the electron density of a given monomer's polymerizable, ethylenically unsaturated group. A positive value for e indicates that a monomer has a relatively low electron density and is an acceptor monomer, as is the case for maleic anhydride, which has an e value of 3.69. A low or negative value for e indicates that a monomer has a relatively high electron density and is a donor monomer, as is the case for vinyl ethyl ether, which has an e value of −1.80.

As referred to herein, a strong acceptor monomer is meant to include those monomers with an e value greater than 2.0. The term "mild acceptor monomer" is meant to include those monomers with an e value greater than 0.5 up to and including those monomers with an e value of 2.0. Conversely, the term "strong donor monomer" is meant to include those monomers with an e value of less than −1.5, and the term "mild donor monomer" is meant to include those monomers with an e value of less than 0.5 to those with an e value of −1.5.

The present invention is directed to a thermosetting composition that includes a copolymer composition that contains a functional group-containing copolymer having at least 30 mol %, in many cases at least 40 mol %, typically at least 50 mol %, in some cases at least 60 mol %, and in other cases at least 75 mol % of residues of the copolymer derived from alternating sequences of donor monomer—acceptor monomer pairs having the alternating monomer residue units of structure:

-[DM-AM]- where DM represents a residue from a donor monomer and AM represents a residue from an acceptor monomer. The copolymer may be a 100% alternating copolymer of DM and AM. More particularly, at least 15 mol % of the copolymer comprises a donor monomer; which is an isobutylene-type monomer, having the following structure (I):

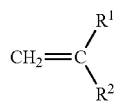

(I)

where $R^1$ is linear or branched $C_1$ to $C_4$ alkyl; $R^2$ is one or more of methyl, linear, cyclic, or branched $C_1$ to $C_{20}$ alkyl, alkenyl, aryl, alkaryl, and aralkyl. Further, at least 15 mol % of the copolymer includes an acrylic monomer as an acceptor monomer. The group $R^2$ may include one or more functional groups selected from hydroxy, epoxy, carboxylic acid, ether, carbamate, and amide.

Thermosetting compositions of the present invention often have a VOC content of less than 4 percent by weight, typically less than 3.5 percent by weight and many times less than 3 percent by weight.

Of note in the present copolymer is that the copolymer incorporates a substantial portion of alternating residues of a mild donor monomer as described by structure I and a mild acceptor monomer, which is an acrylic monomer. A non-limiting list of published e values for monomers that may be included as monomers described by structure I and acrylic monomers of the present invention are shown in Table 2.

TABLE 2

Alfrey-Price e values for Selected Monomers

| Monomer | e value |
| --- | --- |
| Monomers of structure 1 | |
| Isobutylene | −1.20[1] |
| Diisobutylene | 0.49[2] |
| Acrylic Monomers | |
| Acrylic Acid | 0.88[1] |
| Acrylamide | 0.54[1] |
| Acrylonitrile | 1.23[1] |
| Methyl Acrylate | 0.64[1] |
| Ethyl Acrylate | 0.55[1] |
| Butyl Acrylate | 0.85[1] |
| Benzyl acrylate | 1.13[1] |
| Glycidyl acrylate | 1.28[1] |

[1]Polymer Handbook, Fourth Edition (1999)
[2]Rzaev et al., Eur. Polym. J., Vol. 24, No. 7, pp. 981–985 (1998)

The present copolymer composition is substantially free of maleate monomer residues and fumarate monomer residues, which typically have e values greater than 2.0. These types of multifunctional monomers provide too many functional groups to the copolymer. This can create problems, for example in coatings where a thermosetting composition may have a short shelf-life due to the overly functional nature of the copolymer.

Further, the present copolymer composition is substantially free of transition metals and Lewis acids which, as noted above, have been used in the prior art to make alternating copolymers of mild donor monomers and mild acceptor monomers. The present invention does not utilize transition metal or Lewis acid adjuncts in preparing the present copolymer composition, therefore, they need not be removed after polymerization and the resulting copolymer compositions will not suffer the drawbacks inherent in those that contain transition metals or Lewis acids.

Any suitable donor monomer may be used in the present invention. Suitable donor monomers that may be used include strong donor monomers and mild donor monomers. The present invention is particularly useful for preparing alternating copolymers where a mild donor molecule is used. The present copolymers will include a mild donor monomer described by structure I, such as isobutylene and diisobutylene dipentene, and isoprenol, and may additionally include other suitable mild donor monomers. The mild donor monomer of structure I is present in the copolymer composition at a level of at least 15 mol %, in some cases at least 25 mol %, typically at least 30 mol % and in some cases at least 35 mol %. The mild donor monomer of structure I is present in the copolymer composition at a level of up to 50 mol %, in some cases up to 47.5 mol %, typically up to 45 mol %, and, in some cases, up to 40 mol %. The level of the mild donor monomer of structure I used is determined by the properties that are to be incorporated into the copolymer composition. Residues from the mild donor monomer of structure 1 may be present in the copolymer composition in any range of values inclusive of those stated above.

Suitable other donor monomers that may be used in the present invention include, but are not limited to, ethylene, butene, styrene, substituted styrenes, methyl styrene, substituted styrenes, vinyl ethers, vinyl esters, vinyl pyridines, divinyl benzene, vinyl naphthalene, and divinyl naphthalene. Vinyl esters include vinyl esters of carboxylic acids which include, but are not limited to vinyl acetate, vinyl butyrate, vinyl 3,4-dimethoxybenzoate, and vinyl benzoate. The use of other donor monomers is optional, when other donor monomers are present, they are present at a level of at least 0.01 mol % of the copolymer composition, often at least 0.1 mol %, typically at least 1 mol %, and, in some cases, at least 2 mol %. The other donor monomers may be present at up to 25 mol % in some cases up to 20 mol %, typically up to 10 mol %, and, in some cases, up to 5 mol % The level of other donor monomers used is determined by the properties that are to be incorporated into the copolymer composition. Residues from the other donor monomers may be present in the copolymer composition in any range of values inclusive of those stated above.

The copolymer composition includes acceptor monomers as part of the alternating donor monomer—acceptor monomer units along the copolymer chain. Any suitable acceptor monomer may be used. Suitable acceptor monomers include strong acceptor monomers and mild acceptor monomers. A non-limiting class of suitable acceptor monomers are those described by the structure (II):

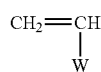

(II)

where W is selected from the group consisting of —CN, —X, and —C(=O)—Y, wherein Y is selected from the group consisting of —NR$^3_2$, —O—R$^5$—O—C(=O)—NR$^3_2$, and —OR$^4$, R$^3$ is selected from the group consisting of H, linear or branched $C_1$ to $C_{20}$ alkyl, and linear or branched $C_1$ to $C_{20}$ alkylol, R$^4$ is selected from the group consisting of H, poly(ethylene oxide), poly(propylene oxide), linear or branched $C_1$ to $C_{20}$ alkyl, alkylol, aryl and aralkyl, linear or branched $C_1$ to $C_{20}$ fluoroalkyl, fluoroaryl and fluoroaralkyl, a siloxane radical, a polysiloxane radical, an alkyl siloxane radical, an ethoxylated trimethylsilyl siloxane radical, and a propoxylated trimethylsilyl siloxane radical, R$^5$ is a divalent linear or branched $C_1$ to $C_{20}$ alkyl linking group, and X is a halide.

A class of mild acceptor monomers that are included in the present copolymer composition are acrylic acceptor monomers. Suitable acrylic acceptor monomers include those described by structure (III):

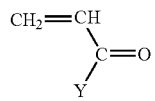

(III)

where Y is selected from the group consisting of —NR$^3_2$, —O—R$^5$—O—C(=O)—NR$^3_2$, and —OR$^4$, R$^3$ selected from the group consisting of H, linear or branched $C_1$ to $C_{20}$ alkyl, and linear or branched $C_1$ to $C_{20}$ alkylol, R$^4$ is selected from the group consisting of H, poly(ethylene oxide), poly (propylene oxide), linear or branched $C_1$ to $C_{20}$ alkyl, alkylol, aryl and aralkyl, linear or branched $C_1$ to $C_{20}$ fluoroalkyl, fluoroaryl and fluoroaralkyl, a siloxane radical, a polysiloxane radical, an alkyl siloxane radical, an ethoxylated trimethylsilyl siloxane radical, and a propoxylated trimethylsilyl siloxane radical, and R$^5$ is a divalent linear or branched $C_1$ to $C_{20}$ alkyl linking group.

A particularly useful type of acrylic acceptor monomers are those described by structure III where Y includes at least one functional group of epoxy, oxirane, carboxylic acid, hydroxy, methylol, methylol ether, amide, oxazoline, aceto acetate, isocyanate, carbamate, primary amine, secondary, amine salt, quaternized amine, thioether, sulfide, sulfonium salt, or phosphate.

Examples of suitable acceptor monomers include; but are not limited to, hydroxyethyl acrylate, hydroxypropyl acrylate, acrylic acid, methyl acrylate, ethyl acrylate, butyl acrylate, isobutyl acrylate, isobornyl acrylate, dimethylaminoethyl acrylate, acrylamide, perfluoro methyl ethyl acrylate, perfluoro ethyl ethyl acrylate; perfluoro butyl ethyl acrylate, trifluoromethyl benzyl acrylate, perfluoro alkyl ethyl, acryloxyalkyl terminated polydimethylsiloxane, acryloxyalkyl tris(trimethylsiloxy silane), and acryloxyalkyl trimethylsiloxy terminated polyethylene oxide, chlorotrifluoro ethylene, glycidyl acrylate, 2-ethylhexyl acrylate, and n-butoxy methyl acrylamide.

The acrylic acceptor monomers of structure III are present in the copolymer composition at a level of at least 15 mol %, in some cases at least 25 mol %, typically at least 30 mol %, and, in some cases, at least 35 mol %. The acrylic acceptor monomers of structure III are present in the copolymer composition at a level of up to 50 mol %, in some cases up to 47.5 mol %, typically up to 45 mol %, and, in some cases, up to 40 mol %. The level of the acrylic acceptor monomers of structure III used is determined by the properties that are to be incorporated into the copolymer composition. Residues from the acrylic acceptor monomers of structure III may be present in the copolymer composition in any range of values inclusive of those stated above.

Suitable other mild acceptor monomers that may be used in the present invention include, but are not limited to, acrylonitrile, methacrylonitrile, vinyl halides, crotonic acid, vinyl alkyl sulfonates, and acrolein. Vinyl halides include, but are not limited to, vinyl chloride and vinylidene fluoride. The use of other mild acceptor monomers is optional, when other mild acceptor monomers are present, they are present at a level of at least 0.01 mol % of the copolymer composition, often at least 0.1 mol %, typically at least 1 mol %, and, in some cases, at least 2 mol %. The other acceptor monomers may be present at up to 35 mol %, in some cases up to 25 mol %, typically up to 15 mol %, and, in some cases, up to 10 mol %. The level of other acceptor monomers used is determined by the properties that are to be incorporated into the copolymer composition. Residues from the other acceptor monomers may be present in the copolymer composition in any range of values inclusive of those stated above.

The present copolymer has a molecular weight of at least 250, in many cases at least 500, typically at least 1,000, and, in some cases, at least 2,000. The present copolymer may have a molecular weight of up to 1,000,000, in many cases up to 500,000, typically up to 100,000, and, in some cases, up to 50,000. Certain applications will require that the molecular weight of the present copolymer not exceed 30,000, in some cases not exceed 25,000, in other cases not exceed 20,000, and, in certain instances, not exceed 16,000. The molecular weight of the copolymer is selected based on the properties that are to be incorporated into the copolymer composition. The molecular weight of the copolymer may vary in any range of values inclusive of those stated above.

The polydispersity index (PDI) of the present copolymer is not always critical. The polydispersity index of the copolymer is usually less than 4, in many cases less than 3.5, typically less than 3.0, and, in some cases, less than 2.5. As used herein, and in the claims, "polydispersity index" is determined from the following equation: (weight average molecular weight (Mw)/number average molecular weight (Mn)). A monodisperse polymer has a PDI of 1.0. Further, as used herein, Mn and Mw are determined from gel permeation chromatography using polystyrene standards.

In an embodiment of the present copolymer composition, the alternating sequences of donor monomer—acceptor monomer pairs are residues have the alternating structure IV:

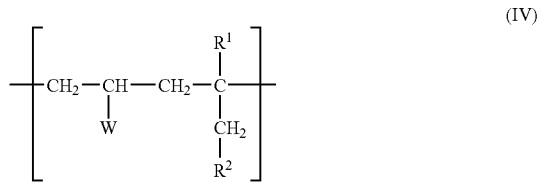

where $R^1$, $R^2$, and W are defined as above. A particularly preferred embodiment is one wherein the monomer residues containing the group W are derived from one or more acrylic monomers, and the monomer residues containing the groups $R^1$ and $R^2$ are derived from one or a combination of diisobutylene, isobutylene, dipentene, and isoprenol. The copolymer compositions of the present invention may also include other polymerizable, ethylenically unsaturated monomers.

The copolymer composition of the present invention may have all of the incorporated monomer residues in an alternating architecture. A non-limiting example of a copolymer segment having 100% alternating architecture of diisobutylene (DIIB) and an acrylic monomer (Ac) is shown by structure V:

-Ac-DIIB-Ac-DIIB-Ac-DIIB-Ac-DIIB-Ac-DIIB-Ac-DIIB-Ac- (V)

However, in most instances, the present copolymer will contain alternating segments and random segments as shown by structure VI, a copolymer of DIIB, Ac and other monomers, M:

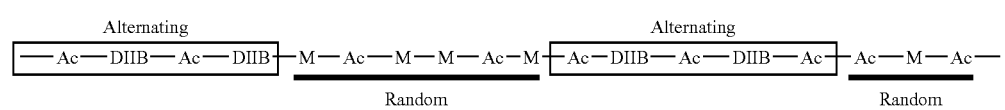

Structure VI shows an embodiment of the present invention where the copolymer may include alternating segments as shown in the boxes and random segments as shown by the underlined segments.

The random segments of the copolymer may contain donor or acceptor monomer residues that have not been incorporated into the copolymer composition by way of an alternating architecture. The random segments of the copolymer composition may further include residues from other ethylenically unsaturated monomers. As recited herein, all references to polymer segments derived from alternating sequences of donor monomer—acceptor monomer pairs are meant to include segments of monomer residues such as those shown by the boxes in structure VI.

The other ethylenically unsaturated monomers include any suitable monomer not traditionally categorized as being an acceptor monomer or a donor monomer.

The other ethylenically unsaturated monomers, residue M of structure VI, is derived from at least one ethylenically unsaturated, radically polymerizable monomer. As used herein and in the claims, "ethylenically unsaturated, radically polymerizable monomer", and like terms, are meant to include vinyl monomers, allylic monomers, olefins, and other ethylenically unsaturated monomers that are radically polymerizable and not classified as donor monomers or acceptor monomers.

Classes of vinyl monomers from which M may be derived include, but are not limited to monomer residues derived from monomers of the general formula VII:

where $R^{11}$, $R^{12}$, and $R^{14}$ are independently selected from the group consisting of H, $CF_3$, straight or branched alkyl of 1 to 20 carbon atoms, aryl, unsaturated straight or branched alkenyl or alkynyl of 2 to 10 carbon atoms, unsaturated straight or branched alkenyl of 2 to 6 carbon atoms substituted with a halogen, $C_3$–$C_8$ cycloalkyl, heterocyclyl and phenyl; $R_{13}$ is selected from the group consisting of H, $C_1$–$C_6$ alkyl, $COOR^{15}$, wherein $R^{15}$ is selected from the group consisting of H, an alkali metal, a $C_1$ to $C_6$ alkyl group, glycidyl, and aryl.

Specific examples of other monomers, M, that may be used in the present invention include methacrylic monomers and allylic monomers. Residue M may be derived from at least one of alkyl methacrylate having from 1 to 20 carbon atoms in the alkyl group. Specific examples of alkyl methacrylates having from 1 to 20 carbon atoms in the alkyl group from which residue M may be derived include, but are not limited to, methyl methacrylate, ethyl methacrylate, propyl methacrylate, isopropyl methacrylate, butyl methacrylate, isobutyl methacrylate, tert-butyl methacrylate, 2-ethylhexyl methacrylate, lauryl methacrylate, isobornyl methacrylate, cyclohexyl methacrylate, 3,3,5-trimethylcyclohexyl methacrylate, as well as functional methacrylates, such as hydroxyalkyl methacrylates, oxirane functional methacrylates, and carboxylic acid functional methacrylates.

Residue M may also be selected from monomers having more than one methacrylate group, for example, methacrylic anhydride and diethyleneglycol bis(methacrylate).

As used herein and in the claims, by "allylic monomer(s)" what is meant is monomers containing substituted and/or unsubstituted allylic functionality, i.e., one or more radicals represented by the following general formula VIII, $H_2C=C(R^{10})-CH_2-$ (VIII)

where $R^{10}$ is hydrogen, halogen, or a $C_1$ to $C_4$ alkyl group. Most commonly, $R^{10}$ is hydrogen or methyl and, consequently, general formula VII represents the unsubstituted (meth)allyl radical, which encompasses both allyl and methallyl radicals. Examples of allylic monomers include, but are not limited to, (meth)allyl alcohol (meth)allyl ethers, such as methyl (meth)allyl ether; allyl esters of carboxylic acids, such as (meth)allyl acetate, (meth)allyl butyrate, (meth)allyl 3,4-dimethoxybenzoate, and (meth)allyl benzoate.

The present copolymer composition is prepared by a method including the steps of (a) providing a donor monomer composition comprising one or more donor monomers of structure I; (b) mixing an ethylenically unsaturated monomer composition comprising one or more acceptor monomers with (a) to form a total monomer composition substantially free of maleate- and fumarate-type monomers; and (c) polymerizing the total monomer composition in the presence of a free radical initiator in the substantial absence of transition metals and Lewis acids. In an embodiment of the present invention, the ethylenically unsaturated monomer composition includes monomers of structure III.

In an embodiment of the present method, the monomer of structure I is present at a molar excess based on the amount of acrylic acceptor monomer. Any amount of excess monomer of structure I may be used in the present invention in order to encourage the formation of the desired alternating architecture. The excess amount of monomer of structure I may be at least 10 mol %, in some cases up to 25 mol %, typically up to 50 mol %, and, in some cases, up to 100 mol %, based on the amount of acrylic acceptor monomer. When the molar excess of monomer of structure I is too high, the process may not be economical on a commercial scale.

In a further embodiment of the present method, the acrylic acceptor monomer is present in an amount of at least 15 mol %, in some cases 17.5 mol %, typically at least 20 mol %, and, in some cases, 25 mol % of the total monomer composition. The acrylic acceptor monomer may further be present in an amount up to 50 mol %, in some cases up to 47.5 mol %, typically up to 45 mol %, and, in some cases, up to 40 mol % of the total monomer composition. The level of the acrylic acceptor monomers used is determined by the properties that are to be incorporated into the copolymer composition. The acrylic acceptor monomers may be present in the monomer composition in any range of values inclusive of those stated above.

The ethylenically unsaturated monomer composition of the present method may include other donor monomers as, described above, as well as other monomers designated by M and described above. The use of other mild acceptor monomers is optional in the present method. When other mild acceptor monomers are present, they are present at a level of at least 0.01 mol % of the copolymer composition, often at least 0.1 mol %, typically at least mol %, and, in some cases, at least 2 mol %, of the total monomer composition. The other acceptor monomers may be present at up to 35 mol %, in some cases up to 25 mol %, typically up to 15 mol %, and, in some cases, up to 10 mol % of the total monomer composition. The level of other acceptor monomers used herein is determined by the properties that are to be incorporated into the copolymer composition Residues from the other acceptor monomers may be present in the copolymer composition in any range of values inclusive of those stated above.

The use of other monomers, M, is optional in the present method. When other monomers are present, they are present at a level of at least 0.01 mol % of the copolymer composition, often at least 0.1 mol %, typically at least 1 mol %, and, in some cases, at least 2 mol %. The other monomers may be present at up to 35 mol %, in some cases up to 25 mol %, typically up to 15 mol %, and, in some cases, up to 10 mol %. The level of other monomers used herein is determined by the properties that are to be incorporated into the copolymer composition. Residues from the other monomers, M, may be present in the copolymer composition in any range of values inclusive of those stated above.

In an embodiment of the present method, an excess of monomer of structure I is used and the unreacted monomer of structure I is removed from the resulting copolymer, composition by evaporation. The removal of unreacted monomer is typically facilitated by the application of a vacuum to the reaction vessel.

Any suitable free radical initiator may be used in the present invention. Examples of suitable free radical initiators include, but are not limited to thermal free radical initiators, photo-initiators, and redox initiators. Examples of suitable thermal free radical initiators include, but are not limited to, peroxide compounds, azo compounds, and persulfate compounds.

Examples of suitable peroxide compound initiators include, but are not limited to, hydrogen peroxide, methyl ethyl ketone peroxides, benzoyl peroxides, di-t-butyl peroxide, di-t-amyl peroxide, dicumyl peroxide, diacyl peroxides, decanoyl peroxides, lauroyl peroxides, peroxydicarbonates, peroxyesters, dialkyl peroxides, hydroperoxides, peroxyketals, and mixtures thereof.

Examples of suitable azo compounds include, but are not limited to, 4-4'-azobis(4-cyanovaleric acid), 1-1'-azobiscyclohexanecarbonitrile), 2-2'-azobisisobutyronitrile, 2-2'-azobis(2-methylpropionamidine) dihydrochloride 2-2'-azobis(2-methylbutyronitrile), 2-2'-azobis(propionitrile), 2-2'-azobis(2,4-dimethylvaleronitrile), 2-2'-azobis(valeronitrile), 2,2'-azobis[2-methyl-N-(2-hydroxyethyl)propionamide], 4,4'-azobis(4-cyanopentanoic acid), 2,2'-azobis(N,N'-dimethyleneisobutyramidine), 2,2'azobis(2-amidinopropane) dihydrochloride, 2,2'-azobis(N,N'dimethyleneisobutyramidine) dihydrochloride, and 2-(carbamoylazo)-isobutyronitrile.

In an embodiment of the present invention, the ethylenically unsaturated monomer composition and the free radical polymerization initiator are separately and simultaneously added to and mixed with the donor monomer composition. The ethylenically unsaturated monomer composition and the free radical polymerization initiator may be added to the donor monomer composition over a period of at least 15 minutes, in some cases at least 20 minutes, typically at least 30 minutes, and, in some cases, at least 1 hour. The ethylenically unsaturated monomer composition and the free radical polymerization initiator may further be added to the donor monomer composition over a period of up to 24 hours, in some case up to 18 hours, typically up to 12 hours, and, in some cases, up to 8 hours. The time for adding the ethylenically unsaturated monomer must be sufficient to maintain a suitable excess of donor monomer of structure I over unreacted acrylic acceptor monomer to encourage the formation of donor monomer—acceptor monomer alternating segments. The addition time is not so long as to render the process economically unfeasible on a commercial scale. The addition time may vary in any range of values inclusive of those stated above.

After mixing or during addition and mixing, polymerization of the monomers takes place. The present polymerization method can be run at any suitable temperature. Suitable temperature for the present method may be ambient, at least 50° C., in many cases at least 60° C., typically at least 75°

C., and, in some cases, at least 100° C. Suitable temperature for the present method may further be described as being up to 300° C., in many cases up to 275° C., typically up to 250° C., and, in some cases, up to 225° C. The temperature is typically high enough to encourage good reactivity from the monomers and initiators employed. However, the volatility of the monomers and corresponding partial pressures create a practical upper limit on temperature determined by the pressure rating of the reaction vessel. The polymerization temperature may vary in any range of values inclusive of those stated above.

The present polymerization method can be run at any suitable pressure. A suitable pressure for the present method may be ambient, at least 1 psi, in many cases at least 5 psi, typically at least 15 psi, and, in some cases, at least 20 psi. Suitable pressures for the present method may further be described as being up to 200 psi, in many cases up to 175 psi, typically up to 150 psi, and, in some cases, up to 125 psi. The pressure is typically high enough to maintain the monomers and initiators in a liquid phase. The pressures employed have a practical upper limit based on the pressure rating of the reaction vessel employed. The pressure during polymerization temperature may vary in any range of values inclusive of those stated above.

The copolymer that results from the present method may be utilized as a starting material for the preparation of other polymers by using functional group transformations by methods known in the art. Functional groups that can be introduced by these methods are epoxy, carboxylic acid, hydroxy, amide, oxazoline, acetoacetate, isocyanate, carbamate, amine, amine salt, quaternary ammonium, thioether, sulfide, sulfonium and phosphate.

For example, a copolymer of the present method comprising methyl acrylate will contain carbomethoxy groups. The carbomethoxy groups can be hydrolyzed to carboxyl groups or transesterified with an alcohol to form the corresponding ester of the alcohol. Using ammonia, the aforementioned methyl acrylate copolymer can be converted to an amide, or, using a primary or secondary amine, can be converted to the corresponding N-substituted amide. Similarly, using a diamine such as ethylene diamine, one can convert the aforementioned copolymer of the present method to an N-aminoethylamide, or, with ethanolamine, to an N-hydroxyethylamide. The N-aminoethylamide functionality can be further converted to an oxazoline by dehydration. The N-aminoethylamide can be further reacted with a carbonate such as propylene carbonate to produce the corresponding urethane functional copolymer. These transformations can be carried out to convert all of the carbomethoxy groups or can be carried out in part, leaving some of the carbomethoxy groups intact.

Epoxy groups can be introduced into the copolymer of the present method directly by using glycidyl acrylate in the copolymer preparation or indirectly by functional group transformation. One example of an indirect method is to oxidize residual unsaturation in the copolymer to epoxy groups using a peracid such as peroxyacetic acid. Alternatively one can prepare a carboxyl-functional copolymer by hydrolysis as described above, treat the carboxyl-functional copolymer with epichlorohydrin then alkali to produce the epoxy functional copolymer. These transformations can also be carried out exhaustively or in part. The resulting epoxy-functional copolymer can be further reacted with the appropriate active hydrogen containing reagents to form alcohols, amines or sulfides.

Hydroxyl groups can be introduced directly using a hydroxyl-functional monomer such as hydroxyethyl acrylate in the copolymer of the present method, or they can be introduced by functional group transformation. By treating the carboxyl-functional copolymer described above with an epoxy one can produce a hydroxyl functional polymer. Suitable epoxies include, but are not limited to, ethylene oxide, propylene oxide, butylene oxide and glycidyl neodecanoate.

The above-described hydroxyl functional copolymers can be further reacted to form other copolymers. For example, a copolymer containing hydroxyethyly groups can be treated with, a carbamylating agent, such as methyl carbamate, to produce the corresponding carbamate functional copolymer. With diketene or t-butyl acetoacetate the hydroxyl groups can also be converted to acetoacetate esters.

Iscyanate functional copolymers can also be produced. Copolymers of the present method which contain 2 or more hydroxyl groups, can be treated with a diisocyariate such as isophoronediisocyanate to produce isocyanate-functional polymers. Primary amine functional copolymers, described, above, can be phosgenated to produce isocyanate functionality.

Ionic functionality can be incorporated into the copolymer of the present method by any means known in the art. Carboxylate groups can be introduced by hydrolysis of ester groups in the copolymer followed by reaction with base. Amine salts can be introduced by preparing the present copolymer with an amine functional acrylate, such as dimethylaminoethyl acrylate, followed by protonation of the amino groups with an acid. Amine salts can also be introduced by reacting a glycidyl functional copolymer with ammonia or an active hydrogen containing amine followed by protonation with acid. Quaternary amine functional groups or ternary sulfonium groups can be introduced into the copolymer by treating an epoxy functional copolymer of the present method with a tertiary amine or sulfide, respectively, in the presence of a protic acid.

A particular embodiment of the present invention is directed to a liquid thermosetting composition that includes an ungelled copolymer composition, that is the copolymer composition containing a functional group-containing copolymer of the present invention and a crosslinking agent having at least two functional groups that are reactive with the functional groups of the copolymer.

In the liquid thermosetting composition, the functional groups in the copolymer are any suitable functional groups. Suitable functional groups include, but are not limited to, epoxy or oxirane, carboxylic acid, hydroxy, amide, oxazoline, aceto acetate, isocyanate, methylol, methylol ether, and carbamate. The crosslinking agent will have suitable functional groups that will react with the functional groups in the copolymer. Suitable functional groups for the crosslinking agent include, but are not limited to, epoxy or oxirane, carboxylic acid, hydroxy, polyol, isocyanate, capped isocyanate, amine, methylol, methylol ether, aminoplast and beta-hydroxyalkylamide.

The functional copolymer will typically have a functional equivalent weight of from 100 to 5,000 grams/equivalent. The equivalent ratio of functional groups of the crosslinking agent to functional equivalents in the functional copolymer is typically within the range of 1:3 to 3:1. The crosslinking agent is present in the liquid thermosetting composition in an amount of from 1 to 45 percent by weight, based on total weight of resin solids, and the functional copolymer is present in an amount of from 55 to 99 percent by weight, based on total weight of resin solids.

A non-limiting example of the present liquid thermosetting composition is one where the functional group of the copolymer is hydroxy and the functional group of the crosslinking agent is a capped polyisocyanate, where the capping group of the capped polyisocyanate crosslinking agent is one or more of hydroxy functional compounds, 1H-azoles, lactams, ketoximes, and mixtures thereof. The capping group may be phenol, p-hydroxy methylbenzoate, 1H-1,2,4-triazole, 1H-2,5-dimethylpyrazole, 2-propanone oxime, 2-butanone oxime, cyclohexanone oxime, ecaprolactam, or mixtures thereof. The polyisocyanate of the capped polyisocyanate crosslinking agent is one or more of 1,6-hexamethylene diisocyanate, cyclohexane diisocyanate, α,α'-xylene diisocyanate, α,α,α',α'-tetramethylxylylene diisocyanate, 1-isocyanato-3,3,5-trimethyl-5-isocyanatomethylcyclohexane, diisocyanatodicyclohexylmethane, dimers of the polyisocyanates, or trimers of the polyisocyanates.

When the copolymer has hydroxy functionality, it will typically have a hydroxy equivalent weight of from 100 to 10,000 grams/equivalent. The equivalent ratio of isocyanate equivalents in the capped polyisocyanate crosslinking agent to hydroxy equivalents in the hydroxy functional copolymer is typically within the range of 1:3 to 3:1. In this embodiment, the capped polyisocyanate crosslinking agent is present in the liquid thermosetting composition in an amount of from 1 to 45 percent by weight, based on total weight of resin solids, and the hydroxy functional copolymer is present in an amount of from 55 to 99 percent by weight, based on total weight of resin solids.

Another non-limiting example of the present liquid thermosetting composition is one where the copolymer has epoxy functional groups and the crosslinking agent is a carboxylic acid functional compound having from 4 to 20 carbon atoms. The carboxylic acid crosslinking agent may be one or more of dodecanedioic acid, azelaic acid, adipic acid, 1,6-hexanedioic acid, succinic acid, pimelic acid, sebacic acid, maleic acid, citric acid, itaconic acid, or aconitic acid.

A further non-limiting example of the present liquid thermosetting composition is one where the copolymer has carboxylic acid functional groups and the crosslinking agent is a beta-hydroxyalkylamide compound. The liquid thermosetting composition may further include a second polycarboxylic acid functional material selected from the group consisting of $C_4$ to $C_{20}$ aliphatic carboxylic acids, polymeric polyanhydrides, polyesters, polyurethanes and mixtures thereof. The beta-hydroxyalkylamide may be represented by the following structure IX:

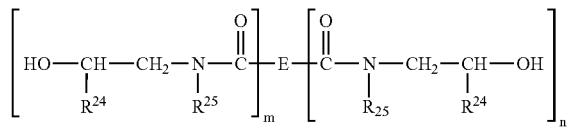

(IX)

where $R^{24}$ is H or $C_1$–$C_5$ alkyl; $R^{25}$ is H, $C_1$–$C_5$ alkyl structure X:

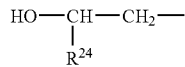

(X)

for which $R^{24}$ is as described above, E is a chemical bond or monovalent or polyvalent organic radical derived from saturated, unsaturated, or aromatic hydrocarbon radicals including substituted hydrocarbon radicals containing from 2 to 20 carbon atoms, m is 1 or 2, n is from 0 to 2, and m+n is at least 2.

The liquid thermosetting composition of the present invention is preferably used as a film-forming (coating) composition and may contain adjunct ingredients conventionally used in such compositions. Optional ingredients such as, for example, plasticizers, surfactants, thixotropic agents, anti-gassing agents, organic cosolvents, flow controllers, anti-oxidants, UV light absorbers, and similar additives conventional in the art may be included in the composition. These ingredients are typically present at up to about 40% by weight based on the total weight of resin solids.

The liquid thermosetting composition of the present invention may be waterborne, but is usually solventborne. Suitable solvent carriers include the various esters, ethers, and aromatic solvents, including mixtures thereof, that are known in the art of coating formulation. The composition typically has a total solids content of about 40 to about 80 percent by weight. The liquid thermosetting compositions of the present invention will often have a VOC content of less than 4 percent by weight, typically less than 3.5 percent by weight and many times less than 3 percent by weight.

The liquid thermosetting composition of the present invention may contain color pigments conventionally used in surface coatings and may be used as a monocoat; that is, a pigmented coating. Suitable color pigments include, for example, inorganic pigments such as titanium dioxide, iron oxides, chromium oxide, lead chromate, and carbon black, and organic pigments such as phthalocyanine blue and phthalocyanine green. Mixtures of the above mentioned pigments may also be used. Suitable metallic pigments include, in particular, aluminum flake, copper bronze flake, and metal oxide coated mica, nickel flakes, tin flakes, and mixtures thereof.

In general, the pigment is incorporated into the coating composition in amounts up to about 80 percent by weight based on the total weight of coating solids. The metallic pigment is employed in amounts of about 0.5 to about 25 percent by weight based on the total weight of coating solids.

In another embodiment, the present thermosetting composition is a co-reactable solid, particulate mixture, or powder of a reactant having at least two functional groups and the present functional group-containing copolymer composition. In the powder thermosetting composition, the reactant may have functional groups selected from epoxy or oxirane, carboxylic acid, hydroxy, polyol, isocyanate, capped isocyanate, amine, aminoplast, methylol, methylol ether, and beta-hydroxyalkylamide. The functional groups of the copolymer may be one or more of epoxy or oxirane, carboxylic acid, hydroxy, amide, oxazoline, aceto acetate, isocyanate, methylol, methylol ether, and carbamate. The functional groups of the reactant will react with the functional groups in the copolymer.

The functional copolymer typically has a functional group equivalent weight of from 100 to 5,000 grams/equivalent and the equivalent ratio of reactant functional groups to functional copolymer functional groups is within the range of 1:3 to 3:1. Typically the reactant is present in an amount of from 1 to 45 percent by weight, based on total weight of resin solids, and the functional copolymer is present in an amount of from 55 to 99 percent by weight, based on total weight of resin solids.

In an embodiment of the present powder thermosetting composition the functional groups of the copolymer are hydroxy functional groups and the reactant is a capped polyisocyanate crosslinking agent. In this embodiment, the capping group of the capped polyisocyanate crosslinking agent is one or more of hydroxy functional compounds, 1H-azoles, lactams, and ketoximes. The capping group is one or more of phenol, p-hydroxy methylbenzoate, 1H-1,2,4-triazole, 1H-2,5-dimethylpyrazble, 2-propanone oxime, 2-butanone oxime; cyclohexanone oxime, and e-caprolactam. The polyisocyanate of the capped polyisocyanate crosslinking agent is one or more of 1,6-hexamethylene diisocyanate, cyclohexane diisocyanate, α,α'-xylylene diisocyanate, α,α',α',α'-tetramethylxylylene diisocyanate, 1-isocyanato-3,3,5-trimethyl-5-isocyanatomethylcyclohexane, 2,4,4-trimethyl hexamethylene diisocyanate, 2,2,4-trimethyl hexamethylene diisocyanate, diisocyanato-dicyclohexylmethane, dimers of said polyisocyanates, and trimers of the polyisocyanates.

The hydroxy functional copolymer typically has a hydroxy equivalent weight of from 100 to 10,000 grams/equivalent and the equivalent ratio of isocyanate equivalents in the capped polyisocyanate crosslinking agent to hydroxy equivalents in the hydroxy functional copolymer is within the range of 1:3 to 3:1. Typically, the capped polyisocyanate crosslinking agent is present in an amount of from 1 to 45 percent by weight, based on total weight of resin solids, and the hydroxy functional copolymer is present in an amount of from 55 to 99 percent by weight, based on total weight of resin solids.

In another embodiment of the powder thermosetting composition, the functional groups of the copolymer are epoxy functional groups and the reactant is a carboxylic functional reactant having from 4 to 20 carbon atoms. The carboxylic acid reactant is typically one or more of dodecanedioic acid, azelaic acid, adipic acid, 1,6-hexanedioic acid, succinic acid, pimelic acid, sebacic acid, maleic acid, citric acid, itaconic acid, and aconitic acid.

In a further embodiment of the powder thermosetting composition, the functional groups of the copolymer are carboxylic functional groups and the reactant is a beta-hydroxyalkylamide. In this embodiment, the powder thermosetting composition may further include a second polycarboxylic acid, typically one or more of $C_4$ to $C_{20}$ aliphatic carboxylic acids, polymeric polyanhydrides, polyesters, polyurethanes, and mixtures thereof. The beta-hydroxyalkylamide is typically one represented by structure IX as detailed above.

The powder thermosetting composition of the present invention may also include one or more cure catalysts for catalyzing the reaction between the crosslinking agent and the functional copolymer. Classes of useful catalysts include metal compounds, in particular, organic tin compounds, and tertiary amines. Examples of organic tin compounds include, but are not limited to, tin(II) salts of carboxylic acids, e.g., tin(II) acetate, tin(II) octanoate, tin(II) ethylhexanoate and tin(II) laurate; tin(IV) compounds, e.g., dibutyltin oxide, dibutyltin dichloride, dibutyltin diacetate, dibutyltin dilaurate, dibutyltin maleate, and dioctyltin diacetate. Examples of suitable tertiary amine catalysts include, but not limited to, diazabicyclo[2.2.2]octane and 1,5-diazabicyclo[4,3,0]non-5-ene. Preferred catalysts include tin(II) octanoate and dibutyltin(IV) dilaurate.

The powder thermosetting composition of the present invention may also include pigments and fillers. Examples of pigments include, but are not limited to, inorganic pigments, e.g., titanium dioxide and iron oxides, organic pigments, e.g., phthalocyanines, anthraquinones, quinacridones and thioindigos, and carbon blacks. Examples of fillers include, but are not limited to, silica, e.g., precipitated silicas, clay, and barium sulfate. When used in the composition of the present invention, pigments and fillers are typically present in amounts of from 0.1 percent to 70 percent by weight, based on total weight of the thermosetting composition. More often, the thermosetting composition of the present invention is used as a clear composition being substantially free of pigments and fillers.

The powder thermosetting composition of the present invention may optionally contain additives such as waxes for flow and wetting, flow control agents, e.g., poly(2-ethylhexyl)acrylate, degassing additives such as benzoin, adjuvant resin to modify and optimize coating properties, antioxidants and ultraviolet (UV) light absorbers. Examples of useful antioxidants and UV light absorbers include those available commercially from Ciba-Geigy under the trademarks IRGANOX and TINUVIN. These optional additives, when used, are typically present in amounts up to 20 percent by weight, based on total weight of the thermosetting composition.

The powder thermosetting composition of the present invention is typically prepared by first dry blending the hydroxy functional polymer, the crosslinking agent and additives, such as flow control agents, degassing agents and catalysts, in a blender, e.g., a Henshel blade blender. The blender is operated for a period of time sufficient to result in a homogenous dry blend of the materials charged thereto. The homogenous dry blend is then melt blended in an extruder, e.g., a twin screw co-rotating extruder, operated within a temperature range of 80° C. to 140° C., e.g., from 100° C. to 125° C. The extrudate of the thermosetting composition of the present invention is cooled and, when used as a powder coating composition, is typically milled to an average particle size of from, for example, 15 to 30 microns.

In a particular embodiment of the present invention, the thermosetting composition is a thermosetting composition that includes a resinous phase dispersed in an aqueous medium. The resinous phase includes an ungelled copolymer composition that includes the copolymer composition described above having a functional group containing one or more active hydrogen groups and a suitable ionic group; and a curing agent having at least two functional groups that are reactive with the active hydrogen groups of the copolymer. Suitable ionic groups include anionic groups and cationic groups. A non-limiting example of a suitable cationic group is an onium salt group. The active hydrogen group-containing copolymer typically has a number average molecular weight in the range of from 1,000 to 30,000.

The functional copolymer has an equivalent weight of from 100 to 5,000 grams/equivalent and the equivalent ratio of functional groups in the curing agent to equivalents in the functional copolymer is within the range of 1:3 to 3:1. The curing agent is present in an amount of from 1 to 45 percent by weight, based on total weight of resin solids, and the functional copolymer is present in an amount of from 55 to 99 percent by weight, based on total weight of resin solids.

The thermosetting composition is in the form of an aqueous dispersion. The term "dispersion" is believed to be a two-phase transparent, translucent, or opaque resinous system in which the resin is in the dispersed phase and the water is in the continuous phase. The average particle size of the resinous phase is generally less than 1.0 and usually less than 0.5 microns, preferably less than 0.15 micron.

The concentration of the resinous phase in the aqueous medium is at least 1 and usually from about 2 to about 60 percent by weight based oh total weight of the aqueous dispersion. When the compositions of the present invention are in the form of resin concentrates, they generally have a resin solids content of about 20 to about 60 percent by weight based on weight of the aqueous dispersion.

The active hydrogen groups of the copolymer are typically provided by residues of one or more of the monomers hydroxyethyl acrylate, hydroxyethyl methacrylate, hydroxypropyl acrylate, hydroxypropyl methacrylate, acrylic acid, methacrylic acid, acrylamide, methacrylamide 2-carbamoyloxyethyl acrylate, 2-carbamoyloxyethyl methacrylate, 2-carbamoyloxypropryl acrylate and 2-carbamyloyloxypropryl methacrylate. More specifically, the active hydrogen groups in the copolymer may be one or more of carboxylic acid, hydroxy, amide, and carbamate; and functional groups of the curing agent are different than those in the copolymer and are one or more of epoxy or oxirane, carboxylic acid, hydroxy, polyol, isocyanate, capped isocyanate, amine, aminoplast, and beta-hydroxyalkylamide.

The onium salt functional monomers are typically one or more of quaternary ammonium salts and ternary sulfonium salts. Non-limiting examples of onium salt functional monomers, residues of which may be included in the present functional copolymer include an epoxy group-containing ethylenically unsaturated monomer which after polymerization has been post-reacted with an amine acid salt, an amine acid salt of dimethyl aminoethyl acrylate, or dimethyl aminoethyl methacrylate and at least one epoxy group-containing monomer which after polymerization has been post-reacted with a sulfide in the presence of an acid. The curing agent is present in an amount of from 1 to 75, in some cases 1 to 45, and typically 1 to 25 percent by weight, based on total weight, of resin solids, and the functional copolymer is present in an amount of from 25 to 99, in some cases 55 to 99, and typically 75 to 99 percent by weight, based on total weight of resin solids.

The thermosetting composition is in the form of an aqueous dispersion of the invention and typically in the form of electrodeposition baths which are usually supplied as two components: (1) a clear resin feed, which includes generally the active hydrogen-containing polymer which contains onium salt groups, i.e., the main film-forming polymer, the curing agent, and any additional water-dispersible, non-pigmented components; and (2) a pigment paste, which generally includes one or more pigments, a water-dispersible grind resin which can be the same or different from the main-film forming polymer, and, optionally, additives such as wetting or dispersing aids. Electrodeposition bath components (1) and (2) are dispersed in an aqueous medium which comprises water and, usually, coalescing solvents. Alternatively, the electrodeposition bath may be supplied as a one-component system which contains the main film-forming polymer, the curing agent, the pigment paste, and any optional additives in one package. The one-component system is dispersed in an aqueous medium as described above.

The electrodeposition bath of the present invention has a resin solids content usually within the range of about 5 to 25 percent by weight based on total weight of the electrodeposition bath.

In addition to water, the aqueous medium may contain a coalescing solvent. Useful coalescing solvents include hydrocarbons, alcohols, esters, ethers, and ketones. The preferred coalescing solvents include alcohols, polyols, and ketones. Specific coalescing solvents include isopropanol, butanol, 2-ethylhexanol, isophorone, 2-methoxypentanone, ethylene, and propylene glycol and the monoethyl, monobutyl, and monohexyl ethers of ethylene or propylene glycol. The amount of coalescing solvent is generally between about 0.01 and 25 percent and, when used, preferably from about 0.05 to about 5 percent by weight based on total weight of the aqueous medium.

A pigment composition and, if desired, various additives, such as surfactants, wetting agents, or catalyst, can be included in the dispersion. The pigment composition may be of the conventional type comprising pigments, for example, iron oxides, strontium chromate, carbon black, coal dust, titanium dioxide, talc, barium sulfate, as well as color pigments, such as cadmium yellow, cadmium red, chromium yellow, and the like. The pigment content of the dispersion is usually expressed as a pigment-to-resin ratio. In the practice of the invention, when pigment is employed, the pigment-to-resin ratio is usually within the range of about 0.02 to 1:1. The other additives mentioned above are usually in the dispersion in amounts of about 0.01 to 3 percent by weight based on weight of resin solids.

In an embodiment of the resinous phase dispersed in an aqueous medium, the active hydrogen functional groups of copolymer are hydroxy and the functional groups of the curing agent are a capped polyisocyanate. The capping group of the capped polyisocyanate crosslinking agent is one or more of hydroxy functional compounds, 1H-azoles, lactams, and ketoximes. The capping group is one or more of phenol, p-hydroxy methylbenzoate, 1H-1,2,4-triazole, 1H-2,5-dimethyl pyrazole, 2-propanone oxime, 2-butanone oxime, cyclohexanone oxime, and e-caprolactam. The polyisocyanate of the capped polyisocyanate curing agent is one or more of of 1,6-hexamethylene diisocyanate, cyclohexane diisocyanate, $\alpha,\alpha'$-xylylene diisocyanate, $\alpha,\alpha,\alpha',\alpha'$-tetramethylxylylene diisocyanate, 1-isocyanato-3,3,5-trimethyl-5-isocyanatomethylcyclohexane, diisocyanato-dicyclohexylmethane, dimers of said polyisocyanates, and trimers of the polyisocyanates.

In a particular embodiment of the thermosetting composition having a resinous phase dispersed in an aqueous medium, the functional groups of copolymer are carboxylic acid functional groups and the curing agent is a beta-hydroxyalkylamide compound. The thermosetting composition may further include a second polycarboxylic acid functional material, which may be one or more of $C_4$ to $C_{20}$ aliphatic carboxylic acids, polymeric polyanhydrides, polyesters, and polyurethanes. The beta-hydroxyalkylamide is typically one represented by structure VIII as detailed above.

In a specific embodiment of the thermosetting composition having a resinous phase dispersed in an aqueous medium, the copolymer is a substantially linear polymer having a number average molecular weight in the range of from 1,000 to 30,000. The copolymer includes residues from an onium salt functional monomer derived from at least one epoxy group-containing monomer which, after polymerization, has been post-reacted with an amine acid salt, hydroxy alkyl acrylates, or methacrylates having 1 to 4 carbon atoms in the alkyl group, at least one acrylate acceptor monomer, and a monomer decribed by structure I.

The present invention is also directed to a method of coating a substrate, which includes the steps of:

(A) applying a thermosetting composition to the substrate;
(B) coalescing the thermosetting composition to form a substantially continuous film; and
(C) curing the thermosetting composition.

The thermosetting composition is typically the liquid thermosetting composition or powder thermosetting composition described above. The thermosetting composition includes the copolymer composition of the present invention, which includes a functional copolymer as previously described and a crosslinking agent having at least two functional groups that are reactive with the functional groups of the functional copolymer.

The thermosetting compositions described above can be applied to various substrates to which they adhere, including wood; metals such as ferrous substrates and aluminum substrates; glass; plastic, plastic and sheet molding compound based plastics.

The compositions can be applied by conventional means including brushing, dipping, flow coating, spraying, and the like, but they are most often applied by spraying. The usual spray techniques and equipment for air spraying and electrostatic spraying and either manual or automatic methods can be used. Substrates that may be coated by the method of the present invention include, for example, wood, metal, glass, and plastic.

The thermosetting composition of the present invention may be applied to the substrate by any appropriate means that are known to those of ordinary skill in the art. The thermosetting composition may be in the form of a dry powder or, alternatively, a liquid medium. When the substrate is electrically conductive, the thermosetting composition is typically electrostatically applied. Electrostatic spray application generally involves drawing the thermosetting composition from a fluidized bed and propelling it through a corona field. The particles of the thermosetting composition become charged as they pass through the corona field and are attracted to and deposited upon the electrically conductive substrate, which is grounded. As the charged particles begin to build up, the substrate becomes insulated, thus limiting further particle deposition. This insulating phenomenon typically limits the film build of the deposited composition to a maximum of 3 to 6 mils (75 to 150 microns).

Alternatively, when the substrate is not electrically conductive, for example as is the case with many plastic substrates, the substrate is typically preheated prior to application of the thermosetting composition. The preheated temperature of the substrate is equal to or greater than that of the melting point of the thermosetting composition, but less than its cure temperature. With spray application over preheated substrates, film builds of the thermosetting composition in excess of 6 mils (150 microns) can be achieved, e.g., 10 to 20 mils (254 to 508 microns).

When the thermosetting composition is a liquid, the composition is allowed to coalesce to form a substantially continuous film on the substrate. Typically, the film thickness will be about 0.01 to about 5 mils (about 0.254 to about 127 microns), preferably about 0.1 to about 2 mils (about 2.54 to about 50.8 microns) in thickness. The film is formed on the surface of the substrate by driving solvent, i.e., organic solvent and/or water, out of the film by heating or by an air drying period. Preferably, the heating will only be for a short period of time, sufficient to ensure that any subsequently applied coatings can be applied to the film without dissolving the composition. Suitable drying conditions will depend on the particular composition but, in general, a drying time of from about 1 to 5 minutes at a temperature of about 68–250° F. (20–121° C.) will be adequate. More than one coat of the composition may be applied to develop the optimum appearance. Between coats, the previously applied coat may be flashed, that is, exposed to ambient conditions for about 1 to 20 minutes.

After application to the substrate, the thermosetting composition is then coalesced to form a substantially continuous film. Coalescing of the applied composition is generally achieved through the application of heat at a temperature equal to or greater than that of the melting point of the composition, but less than its cure temperature. In the case of preheated substrates, the application and coalescing steps can be achieved in essentially one step.

The coalesced thermosetting composition is next cured by the application of heat. As used herein and in the claims, by "cured" is meant a three dimensional crosslink network formed by covalent bond formation, e.g., between the free isocyanate groups of, the crosslinking agent and the hydroxy groups of the polymer. The temperature at which the thermosetting composition of the present invention cures is variable and depends in part on, the type and amount of catalyst used. Typically, the thermosetting composition has a cure temperature within the range of 130° C. to 160° C., e.g., from 140° C. to 150° C.

In accordance with the present invention, there is further provided a multi-component site coating composition that includes a base coat deposited from a pigmented film-forming composition; and a transparent top coat applied over the base coat. Either the base coat or the transparent top coat or both coats may include the liquid thermosetting composition or the powder thermosetting composition described above. The multi-component composite coating composition as described herein is commonly referred to as a color-plus-clear coating composition.

The pigmented film-forming composition from which the base coat is deposited can be any of the compositions useful in coatings applications, particularly automotive applications in which color-plus-clear coating compositions are extensively used. Pigmented film-forming compositions conventionally comprise a resinous binder and a pigment to act as a colorant. Particularly useful resinous binders are acrylic polymers, polyesters including alkyds, polyurethanes, and the copolymer composition of the present invention.

The resinous binders for the pigmented film-forming base coat composition can be organic solvent-based materials, such as those described in U.S. Pat. No. 4,220,679, note column 2 line 24 through column 4, line 40. Also, water-based coating compositions such as those described in U.S. Pat. Nos. 4,403,003, 4,147,679, and 5,071,904 can be used as the binder in the pigmented film-forming composition.

The pigmented film-forming base coat composition is colored and may also contain metallic pigments. Examples of suitable pigments can be found in U.S. Pat. Nos. 4,220,679, 4,403,003, 4,147,679, and 5,071,904.

Ingredients that may be optionally present in the pigmented film-forming base coat composition are those which are well known in the art of formulating surface coatings and include surfactants, flow control agents, thixotropic agents, fillers, anti-gassing agents, organic co-solvents, catalysts, and other customary auxiliaries. Examples of these optional materials and suitable amounts are described in the aforementioned U.S. Pat. Nos. 4,220,679, 4,403,003, 4,147,769, and 5,071,904.

The pigmented film-forming base coat composition can be applied to the substrate by any of the conventional coating techniques, such as brushing, spraying, dipping, or flowing, but are most often applied by spraying. The usual spray techniques and equipment for air spraying, airless spray, and electrostatic spraying employing either manual or automatic methods can be used. The pigmented film-forming, composition is applied in an amount sufficient to provide a base coat having a film thickness typically of 0.1 to 5 mils (2.5 to 125 microns) and preferably 0.1 to 2 mils (2.5 to 50 microns).

After deposition of the pigmented film-forming base coat composition onto the substrate, and prior to application of the transparent top coat, the base coat can be cured or alternatively dried. In drying the deposited base coat, organic solvent and/or water is driven out of the base coat film by heating or the passage of air over its surface. Suitable drying conditions will depend on the particular base coat composition used and on the ambient humidity in the case of certain water-based compositions. In general, drying of the deposited base coat is performed over a period of from 1 to 15 minutes and at a temperature of 21° C. to 93° C.

The transparent top coat is applied over the deposited base coat by any of the methods by which coatings are known to be applied. In an embodiment of the present invention, the transparent top coat is applied by electrostatic spray application as described previously herein. When the transparent top coat is applied over a deposited base coat that has been dried, the two coatings can be co-cured to form the multi component composite coating composition of the present invention. Both the base coat and top coat are heated together to conjointly cure the two layers. Typically, curing conditions of 130° C. to 160° C. for a period of 20 to 30 minutes are employed. The transparent top coat typically has a thickness within the range of 0.5 to 6 mils (13 to 150 microns), e.g., from 1 to 3 mils (25 to 75 microns).

In an embodiment of the present invention, the present thermosetting composition having a resinous phase dispersed in an aqueous medium may be an electrocoating composition used to electrocoat a conductive substrate. In such an instance, the present invention is directed to a method of electrocoating a conductive substrate serving as a cathode in an electrical circuit comprising the cathode and an anode. The cathode and anode are immersed in the aqueous electrocoating composition, and an electric current is passed between the cathode and the anode to cause deposition of the electrocoating composition on the substrate as a substantially continuous film. The aqueous electrocoating composition is the resinous phase of the thermosetting composition having a resinous phase dispersed in an aqueous medium.

Further to this embodiment, the active hydrogen group-containing copolymer containing an ionic group, such as an onium salt groups may be present in the thermosetting compositions of the invention as a resinous binder (i.e., a film-forming polymer) or as an additive in combination with a separate resinous binder. When used as an additive, for example, as a reactive diluent, the active hydrogen group-containing polymer as described herein typically has a high degree of functionality and a correspondingly low equivalent weight. However, it should be appreciated that for other applications, the additive may have low functionality (it may be monofunctional) and a correspondingly high equivalent weight.

The active hydrogen group-containing polymer containing ionic groups is typically present in the thermosetting compositions of the invention in an amount of at least 0.5 percent by weight (when used as an additive) and in an amount of at least 25 percent by weight (when used as a resinous binder), based on total weight of resin solids of the thermosetting composition. The active hydrogen group-containing polymers are also typically present in the thermosetting compositions in an amount of less than 95 percent by weight, and preferably in an amount of less than 80 percent by weight, based on total weight of resin solids of the thermosetting composition. The active hydrogen group-containing polymer may be present in the thermosetting compositions of the invention in an amount ranging between any combination of these values, inclusive of the recited values.

The thermosetting compositions of the invention are typically in the form of electrodeposition baths which are usually supplied as two components: (1) a clear resin feed, which includes generally the active hydrogen-containing polymer which contains onium salt groups, i.e., the main film-forming polymer, the curing agent, and any additional water-dispersible, non-pigmented components; and (2) a pigment paste, which generally includes one or more pigments, a water-dispersible grind resin which can be the same or different from the main-film forming polymer, and, optionally, additives, such as wetting or dispersing aids. Electrodeposition bath components (1) and (2) are dispersed in an aqueous medium which comprises water and, usually, coalescing solvents. Alternatively, the electrodeposition bath may be supplied as a one-component system which contains the main film-forming polymer, the curing agent, the pigment paste, and any optional additives in one package. The one-component system is dispersed in an aqueous medium as described above.

The electrodeposition bath of the present invention has a resin solids content usually within the range of about 5 to 25 percent by weight based on total weight of the electrodeposition bath.

As aforementioned, besides water, the aqueous medium may contain a coalescing solvent. Useful coalescing solvents include hydrocarbons, alcohols, esters, ethers, and ketones. The preferred coalescing solvents include alcohols, polyols and ketones. Specific coalescing solvents include isopropanol, butanol, 2-ethylhexanol, isophorone, 2-methoxypentanone, ethylene, and propylene glycol and the monoethyl, monobutyl, and monohexyl ethers of ethylene or propylene glycol. The amount of coalescing solvent is generally between about 0.01 and 25 percent and, when used, preferably from about 0.05 to about 5 percent by weight based on total weight of the aqueous medium.

As discussed above, a pigment composition and, if desired, various additives, such as surfactants, wetting agents, or catalyst, can be included in the dispersion. The pigment composition may be of the conventional type comprising pigments, for example, iron oxides, strontium chromate, carbon black, coal dust, titanium dioxide, talc, barium sulfate, as well as color pigments, such as cadmium yellow, cadmium red, chromium yellow, and the like. The pigment content of the dispersion is usually expressed as a pigment-to-resin ratio. In the practice of the invention, when pigment is employed, the pigment-to-resin ratio is usually within the range of about 0.02 to 1:1. The other additives mentioned above are usually in the dispersion in amounts of about 0.01 to 3 percent by weight based on weight of resin solids.

The thermosetting compositions of the present invention can be applied by electrodeposition to a variety of electroconductive substrates, especially metals, such as untreated steel, galvanized steel, aluminum, copper, magnesium, and conductive carbon-coated materials. The applied voltage for electrodeposition may be varied and can be, for example, as low as 1 volt to as high as several thousand volts, but typically between 50 and 500 volts. The current density is usually between 0.5 ampere and 5 amperes per square foot and tends to decrease during electrodeposition indicating the formation of an insulating film.

After the coating has been applied by electrodeposition, it is cured usually by baking at elevated temperatures, such as about 90° to about 260° C. for about 1 to about 40 minutes.

The present invention further provides a primed multi-component composite coating composition that includes a primer coat applied by electrodeposition; a base coat deposited from a pigmented film-forming composition; and optionally a transparent top coat applied over the base coat. The electrodeposited primer may include an aqueous electrocoating composition that includes a resinous phase including the present thermosetting composition for electrodeposition described above. The base coat and/or the transparent top coat may include the liquid thermosetting composition or the powder thermosetting composition described above.

Typically, A primer coat is deposited via electrodeposition as described above and cured as described above. Subsequently, a pigmented film-forming base coat composition is applied over the primer coated substrate, and prior to application of a top coat. The base coat can be cured or alternatively dried. In drying the deposited base coat, organic solvent and/or water is driven out of the base coat film by heating or the passage of air over its surface. Suitable drying conditions will depend on the particular base coat composition used and on the ambient humidity in the case of certain water-based compositions. In general, drying of the deposited base coat is performed over a period of from 1 to 15 minutes and at a temperature of 21° C. to 93° C.

The top coat may be applied over the deposited base coat by any of the methods by which coatings are known to be applied. In an embodiment of the present invention, the top coat is applied by electrostatic spray application as described previously herein. When the top coat is applied over a deposited base coat that has been dried, the two coatings can be co-cured to form the primed multi-component composite coating composition of the present invention. Both the base coat and top coat are heated together to conjointly cure the two layers. Typically, curing conditions of 130° C. to 160° C. for a period of 20 to 30 minutes are employed. The transparent top coat typically has a thickness within the range of 0.5 to 6 mils (13 to 150 microns), e.g., from 1 to 3 mils (25 to 75 microns).

The present invention is more particularly described in the following examples, which are intended to be illustrative only, since numerous modifications and variations therein will be apparent to those skilled in the art. Unless otherwise specified, all parts and percentages are by weight.

The following abbreviations are used in the examples.

| AA | acrylic acid |
| DGME | diethylene glycol monobutyl ether |
| DIBK | diisobutyl ketone |
| DIIB | diisobutulyene |
| DMEA | dimethyl ethanolamine |
| DMAEM | dimethyl aminoethyl methacrylate |
| EA | Ethyl Acrylate |
| EGME | ethylene glycol monobutyl ether |
| EGMHE | ethylene glycol monohexyl ether |
| 2EHA | 2-ethylhexyl acrylate |
| HEA | hydroxy ethyl acrylate |
| HPA | hydroxypropylacrylate |

-continued

| IB | Isobutylene |
| MAK | methyl n-amyl ketone |
| MMA | methylmethacrylate |
| MEPGA | methyl ether propylene glycol acetate |
| NBMA | n-butyl methacrylate |
| NBA | n-butyl acrylate |
| Styr | styrene |

EXAMPLE 1-A

Synthesis of alternating copolymer diisobutylene/methyl methacrylate-alt-hydroxypropyl acrylate/butyl acrylate. The ingredients in Table 3 were used for the polymerization.

TABLE 3

| | Ingredients | Parts by weight (grams) |
| --- | --- | --- |
| Charge 1 | Diisobutylene | 337.00 |
| Charge 2 | t-Amylperoxy (2-ethyl hexanoate) | 33.70 |
| Charge 3 | Methyl Methacrylate | 337.00 |
| | Hydroxypropyl Acrylate | 112.30 |
| | Butyl Acrylate | 337.00 |

Charge 1 was added to a 4-liter stirred stainless steel pressure reactor. The reactor was then pressurized with nitrogen providing a 5 psig pad on the reactor. The agitation on the reactor was 500' rpm and the reactor temperature was adjusted to 125° C. Charge 2 was added to the reactor at an addition rate of 9.62 grams/hour over 3.5 hours. Fifteen minutes after Charge 2 was started, Charge 3 was added to the reactor at an addition rate of 262.10 grams/hour over 3 hours. During the monomer addition the temperature was maintained at 125° C. at 40 PSI. After the addition of Charge 2 and Charge 3 was complete, the reaction mixture was held for 2 hours. The reactor was then cooled to 25° C., and vented. Gas chromatography (GC) analysis of the reaction mixture showed that all of the (meth)acrylate had reacted. The reaction mixture was transferred to a 3 L flask, and was vacuum-stripped at 130° C. The reaction mixture was cool to 80° C. and 200 grams of n-butyl acetate was added. The solids of the resulting polymer solution was determined to be 78.3% determined at 110° C. for one hour. The copolymer had a number average molecular weight ($M_n$) of 1,200 and polydispersity ($M_w/M_n$) of 2.0 (determined by gel permeation chromatography using polystyrene as a standard). A $^{13}$C NMR spectrum was consistent with a molar copolymer composition of 21.9% diisobutylene, 11.1% hydroxypropyl acrylate, 33.5% methyl methacrylate, and 33.5% butyl acrylate.

EXAMPLE 1-B

Synthesis of alternating copolymer diisobutylene-alt-hydroxypropyl acrylate/butyl acrylate. The ingredients in Table 4 were used for the polymerization in isopropanol solvent.

TABLE 4

| | Ingredients | Parts by weight (grams) |
| --- | --- | --- |
| Charge 1 | Diisobutylene | 500 |
| | Isopropanol | 400 |

TABLE 4-continued

| Ingredients | | Parts by weight (grams) |
|---|---|---|
| Charge 2 | Di-t-amyl Peroxide | 20 |
| | Isopropanol | 100 |
| Charge 3 | Hydroxypropyl Acrylate | 250 |
| | Butyl Acrylate | 250 |

Charge 1 was added to a 4-liter stirred stainless steel pressure reactor. The reactor was pressurized with nitrogen to provide a 5 psig pad on the reactor. The agitation on the reactor was set at 500 rpm and the reactor temperature was adjusted to 150° C. Charge 2 was added to the reactor at an addition rate of 48 grams/hour over 2.5 hours. After 15 minutes Charge 3 was added to reactor at an addition rate 250 grams/hour over 2 hours. During the monomer addition the temperature was maintained at 150° C. and 100 PSI. After Charge 2 and Charge 3 were in the reactor, the reaction mixture was held for 2 hours. The reactor was then cooled to 25° C., and vented. GC analysis of the reaction mixture showed that all acrylates were reacted. The reaction mixture was transferred to a 2 L flask, and was vacuum-stripped at 130° C. The solids of the resulting polymer solution was determined to be 100% determined at 110° C. for one hour. The copolymer had $M_n$=850 and $M_w/M_n$=1.7. The $^{13}$C NMR spectrum was consistent with a molar copolymer composition of 24.7% diisobutylene, 37.65% hydroxypropyl acrylate, and 37.65% butyl acrylate.

EXAMPLE 1-C

Synthesis of alternating copolymer diisobutylene-alt-hydroxyethyl acrylate/butyl acrylate. The ingredients in Table 5 were used for the polymerization in isopropanol solvent.

TABLE 5

| Ingredients | | Parts by weight (grams) |
|---|---|---|
| Charge 1 | Diisobutylene | 500 |
| | Isopropanol | 400 |
| Charge 2 | Di-t-amyl Peroxide | 20 |
| | Isopropanol | 100 |
| Charge 3 | Hydroxyethyl Acrylate | 250 |
| | Butyl Acrylate | 250 |

Charge 1 was added to a 4-liter stirred stainless steel pressure reactor. The reactor was then pressurized with nitrogen to provide a 5 psig pad on the reactor. The agitation on the reactor was set at 500 rpm and the reactor temperature was adjusted to 150° C. Charge, 2 was added to the reactor at an addition rate of 48 grams/hour over 2.5 hours. After 15 minutes Charge 3 was added to reactor at an addition rate of 250 grams/hour over 2 hours. During the monomer addition the temperature was maintained at 150° C. and 100 PSI. After Charge 2 and Charge 3 were in the reactor, the reaction mixture was held for 2 hours. The reactor was then cooled to 25° C., and vented. GC analysis of the reaction mixture showed that all acrylates were reacted. The reaction mixture was transferred to a 2 L flask, and was vacuum-stripped at 130° C. The solids of the resulting polymer was determined to be 100% determined at 110° C. for one hour. The copolymer had number average molecular weight, $M_n$=910 and polydispersity $M_w/M_n$=1.8 (determined by gel permeation chromatography using polystyrene as a standard). The $^{13}$C NMR spectrum is consistent with copolymer composition 25% Diisobutylene, 37.5% Hydroxyethyl acrylate, and 37.5% Butyl acrylate.

EXAMPLE 2-D

Synthesis of alternating copolymer diisobutylene-alt-hydroxypropyl acrylate/butyl acrylate/acrylic acid. The ingredients in Table 6 were used for the polymerization.

TABLE 6

| Ingredients | | Parts by weight (grams) |
|---|---|---|
| Charge 1 | Diisobutylene | 1120.00 |
| Charge 2 | Di-t-amyl Peroxide | 93.60 |
| Charge 3 | Acrylic acid | 144.00 |
| | Hydroxypropyl Acrylate | 720.00 |
| | Butyl acrylate | 1136.00 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at an addition rate of 37.4 grams/hour over 2.5 hours. After 15 minutes Charge 3 was added to reactor at an addition rate of 1000 grams/hour over 2 hours. During the monomer addition the temperature was maintained at 150° C. at 100 PSI. After Charge 2 and charge 3 were in the reactor, the reaction mixture was held for 2 hours. The reactor was then cooled to 25° C., and vented. GC analysis of the reaction mixture show that all acrylates were reacted. The reaction mixture was transferred to a 5 L flask, and was vacuum-stripped at 130° C. The solids of the resulting polymer was dissolved in 500 grams of butyl carbitol (Union Carbide) and the final solids of the solution was determined to be 80.73%, determined at 110° C. for one hour. The copolymer had $M_n$=2080 and $M_w/M_n$=2.7. The $^{13}$C NMR spectrum was consistent with a molar copolymer composition of 24% diisobutylene, 27.36% hydroxypropyl acrylate, 43.17%, butyl acrylate, and 5.47% acrylic acid.

EXAMPLE 3-E

Synthesis of alternating copolymer diisobutylene-alt-hydroxyethyl acrylate/butyl acrylate. The ingredients in Table 7 were used for the polymerization.

TABLE 7

| Ingredients | | Parts by weight (grams) |
|---|---|---|
| Charge 1 | Diisobutylene | 1000.00 |
| Charge 2 | Di-t-amyl Peroxide | 85.80 |
| Charge 3 | Hydroxyethyl Acrylate | 714.20 |
| | Butyl Acrylate | 1142.90 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at an addition rate of 34.5 grams/hour over 2.5 hours. After 15 minutes Charge 3 was added to reactor at the addition rate of 928.6 grams/hour over 2 hours. During the monomer addition the temperature was maintained at 150° C. at 70

PSI. After charge 2 and charge 3 were in the reactor, the reaction mixture was held for 2 hours. The reactor was then cooled to 25° C., and vented. GC analysis of reaction mixture showed that all acrylates were reacted. The reaction mixture was transferred to a 5 L flask, and was vacuum-stripped at 130° C. The final solids of the resulting polymer was determined to be 97.56% 110° C. for one hour. The copolymer had $M_{n=}1760$ and $M_w/M_{n=}2.4$. The $^{13}C$ NMR spectrum is consistent with a copolymer composition of 24.43% diisobutylene, 29.06% hydroxyethyl acrylate, and 46.51% butyl acrylate.

EXAMPLE 3-F

Synthesis of alternating copolymer diisobutylene-alt-hydroxypropyl acrylate/butyl acrylate. The ingredients in Table 8 were used for the polymerization.

TABLE 8

| | Ingredients | Parts by weight (grams) |
|---|---|---|
| Charge 1 | Diisobutylene | 1359.20 |
| Charge 2 | Di-t-amyl Peroxide | 116.60 |
| Charge 3 | Hydroxypropyl Acrylate | 970.80 |
| | Butyl Acrylate | 1553.40 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at an addition rate of 46.6 grams/hour over 2.5 hours. After 15 minutes Charge 3 was added to the reactor at an addition rate of 1262.7 grams/hour over 2 hours. During the monomer addition the temperature was maintained at 150° C. and 100 PSI. After charge 2 and charge 3 were in the reactor, the reaction mixture was held for 2 hours. The reactor was then cooled to 25° C., and vented. GC analysis of the reaction mixture showed that all acrylates were reacted. The reaction mixture was transferred to a 5 L flask, and was vacuum-stripped at 130° C. The final solids of the resulting polymer was determined to be 97.96% determined at 110° C. for one hour. The copolymer had $M_{n=}1610$ and $M_w/M_{n=}2.2$. The $^{13}C$ NMR spectrum is consistent with a molar copolymer composition of 23.15% diisobutylene, 29.56% hydroxypropyl acrylate, and 47.29% butyl-acrylate.

EXAMPLE 3-G

Synthesis of alternating copolymer isobutylene-alt-hydroxypropyl acrylate/butyl acrylate. The ingredients in Table 9 were used for the polymerization:

TABLE 9

| | Ingredients | Parts by weight (grams) |
|---|---|---|
| Charge 1 | Isobutylene | 1000.00 |
| Charge 2 | Di-t-amyl Peroxide | 85.80 |
| Charge 3 | Hydroxypropyl Acrylate | 714.20 |
| | Butyl Acrylate | 1142.90 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at an addition rate of 34.3 grams/hour over 2.5 hours. After 15 minutes Charge 3 was added to reactor at an addition rate of 928.6 grams/hour over 2 hours. During the monomer addition the temperature was maintained at 150° C. at 250 PSI. After charge 2 and charge 3 were in the reactor, the reaction mixture was held for 2 hours. The reactor was then cooled to 25° C., and vented. GC analysis of the reaction mixture showed that all acrylates were reacted. The reaction mixture was transferred to a 5 L flask, and was vacuum-stripped at 130° C. The final solids of the resulting polymer was determined to be 89.97% (remainder toluene) at 110° C. for one hour. The copolymer had $M_{n=}2760$ and $M_w/M_{n=}2.7$. The $^{13}C$ NMR spectrum is consistent with a copolymer composition of 35% isobutylene, 25% hydroxypropyl acrylate, and 40% butyl acrylate.

EXAMPLE 3-H

Synthesis of alternating copolymer diisobutylene-alt-hydroxypropyl acrylate/butyl acrylate. The ingredients in Table 10 were used for the polymerization.

TABLE 10

| | Ingredients | Parts by weight (grams) |
|---|---|---|
| Charge 1 | Toluene | 500.00 |
| Charge 2 | Di-t-amyl Peroxide | 69.00 |
| Charge 3 | Hydroxypropyl Acrylate | 690.00 |
| | Butyl Acrylate | 1150.00 |
| | Styrene | 460.00 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at addition rate of 27.6 grams/hour over 2.5 hours. After 15 minutes Charge 3 was added to reactor at an addition rate of 1150 grams/hour over 3 hours. During the monomer addition the temperature was maintained at 150° C. at 80 PSI. After charge 2 and charge 3 were in the reactor, the reaction mixture was held for 2 hours. The reactor was then cooled to 25° C., and vented. GC analysis of the reaction mixture showed that all acrylates and styrene were reacted. The reaction mixture was transferred to a 5 L flask, and was vacuum-stripped at 130° C. The final solids of the resulting polymer was determined to be 83.02% determined at 110° C. for one hour. The copolymer had $M_{n=}5020$ and $M_w/M_{n=}2.5$. The $^{13}C$ NMR spectrum is consistent with a molar copolymer composition of 20% Styrene, 30% Hydroxypropyl acrylate, and 50% Butyl acrylate.

EXAMPLE 4-I

Synthesis of copolymer diisobutylene/hydroxypropyl acrylate/butyl methacrylate/styrene/acrylic acid/butyl acrylate. The ingredients in Table 11 were used for the polymerization:

TABLE 11

| | Ingredients | Parts by weight (grams) |
|---|---|---|
| Charge 1 | Diisobutylene | 500.00 |
| | Isopropanol | 400.00 |
| Charge 2 | Di-t-amyl Peroxide | 30.00 |
| | Isopropanol | 100.00 |

TABLE 11-continued

|  | Ingredients | Parts by weight (grams) |
|---|---|---|
| Charge 3 | Hydroxypropyl Acrylate | 450.00 |
|  | Butyl Methacrylate | 200.00 |
|  | Styrene | 100.00 |
|  | Acrylic Acid | 30.00 |
|  | Butyl Acrylate | 220.00 |

Charge 1 was added to a 4-liter stirred stainless steel pressure reactor. The reactor was then pressurized with nitrogen providing a 5 psig pad on the reactor. The agitation on the reactor was set and the reactor temperature was adjusted to 150° C. Charge 2 was added to the reactor at addition rate of 52 grams/hour over 2.5 hours. After 15 minutes Charge 3 was added to reactor at the addition rate 500 grams/hour over 2 hours. During the monomer addition the temperature was maintained at 150° C. at 100 PSI. After charge 2 and charge 3 were in the reactor, the reaction mixture was held for 2 hours. The reactor was then cooled to 25° C., and vented. GC analysis of the reaction mixture showed that all acrylates, methacrylates and styrene were reacted. The reaction mixture was transferred to a 3 L flask, and was vacuum-stripped at 130° C. The final solids of the resulting polymer was determined by adding 200 grams of butyl acetate to the polymer mixture. The solids were measured at 82.2% at 110° C. for one hour. The copolymer had $M_n=1560$ and $M_w/M_n=2.2$. The $^{13}C$ NMR spectrum is consistent with a molar copolymer composition of 20.4% Diisobutylene, 36.3% Hydroxypropyl acrylate, 16.1% Butyl methacrylate, 8.1% Styrene, 2.4% Acrylic acid, and 17.6% Butyl acrylate.

EXAMPLE 4-J

Synthesis of copolymer diisobutylene/hydroxypropyl acrylate/butyl methacrylate/styrene/butyl acrylate. The ingredients in Table 12 were used for the polymerization:

TABLE 12

|  | Ingredients | Parts by weight (grams) |
|---|---|---|
| Charge 1 | Diisobutylene | 1000.00 |
| Charge 2 | Di-t-amyl Peroxide | 90.00 |
| Charge 3 | Hydroxypropyl Acrylate | 900.00 |
|  | Butyl Methacrylate | 400.00 |
|  | Styrene | 200.00 |
|  | Butyl Acrylate | 500.00 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at an addition rate of 36 grams/hour over 2.5 hours. After 15 minutes Charge 3 was added to reactor at the addition rate 1000 grams/hour over 2 hours. During the monomer addition the temperature was maintained at 150° C. at 100 PSI. After charge 2 and charge 3 were in the reactor, the reaction mixture was held for 2 hours. The reactor was then cooled to 25° C., and vented. GC analysis of the reaction mixture showed that all acrylates, methacrylates and styrene were reacted. The reaction mixture was transferred to 5 L flask, and was vacuum-stripped at 125° C. The final solids of the resulting polymer was determined to be 98.63 at 110° C. for one hour. The copolymer had $M_n=1960$ and $M_w/M_n=2.3$. The $^{13}C$ NMR spectrum is consistent with a molar copolymer composition of 17.67% diisobutylene, 37.1% hydroxypropyl acrylate, 16.36% butyl methacrylate, 8.25% styrene, and 20.62% butyl acrylate.

EXAMPLE 4-K

Synthesis of copolymer diisobutylene/hydroxypropyl acrylate/butyl methacrylate/styrene/hydroxyethyl methacrylate/butyl acrylate. The ingredients in Table 13 were used for the polymerization.

TABLE 13

|  | Ingredients | Parts by weight (grams) |
|---|---|---|
| Charge 1 | Diisobutylene | 1000.00 |
| Charge 2 | Di-t-amyl Peroxide | 90.00 |
| Charge 3 | Hydroxypropyl Acrylate | 450.00 |
|  | Butyl Methacrylate | 400.00 |
|  | Styrene | 200.00 |
|  | Hydroxyethyl Methacrylate | 450.00 |
|  | Butyl Acrylate | 500.00 |
| Charge 4 | Xylene | 250.00 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at an addition rate of 36 grams/hour over 2.5 hours. After 15 minutes Charge 3 was added to reactor at an addition rate of 1000 grams/hour over 2 hours. During the monomer addition the temperature was maintained at 15° C. at 100 PSI. After charge 2 and charge 3 were in the reactor, the reaction mixture was held for 2 hours. The reactor was then cooled to 25° C., and vented. GC analysis of the reaction mixture showed that all acrylates, methacrylates and styrene were reacted. The reaction mixture was transferred to a 5 L flask, and was vacuum-stripped at 125° C. The final solids of the resulting polymer was determined by adding 250 grams of xylene to the polymer mixture. The solids were 87.60% determined at 110° C. for one hour. The copolymer had $M_n=1930$ and $M_w/M_n=2.6$. The $^{13}C$ NMR spectrum is consistent with a molar copolymer composition of 15.6% diisobutylene, 18.99% hydroxypropyl acrylate, 16.88% butyl methacrylate, 8.44% styrene, 18.99% hydroxyethyl methacrylate and 21.10% butyl acrylate.

EXAMPLE 4-L

Synthesis of carbamate functional polymer from diisobutylene/hydroxypropyl acrylate/butyl methacrylate/styrene/butyl acrylate (DIB/HPA/BMA/Sty/BA) copolymer from example 4-J. A carbamate-functional copolymer was prepared from the ingredients in Table 14.

TABLE 14

|  | Ingredients | Parts by weight (grams) |
|---|---|---|
| Charge 1 | Acrylic/Diisobutylene copolymer solution (Example 4-J) | 1067.30 |
|  | Xylene | 85.60 |
|  | Aromatic 100 (ExxonMobil) | 85.60 |
|  | Methyl carbamate | 169.00 |

TABLE 14-continued

| Ingredients | Parts by weight (grams) |
|---|---|
| Butyl stannoic acid | 2.23 |
| Triphenyl phosphite | 2.23 |

A suitable reactor was charged with the above ingredients and equipped with a thermocouple, overhead stirrer, nitrogen inlet and a reflux condenser. The mixture was heated to 144° C. under a nitrogen blanket. At this temperature, the reaction refluxed slightly. The reaction mixture was held for one hour at 145° C. After the hold period was complete, the reflux condenser was removed, and the reactor was equipped for distillation (short column, distillation head, thermocouple, and receiver flask) at atmospheric pressure. Distillate began to be collected at 145° C. The temperature of the reaction was gradually increased over a 6 hour period to 155° C. to maintain a steady rate of distillation. When distillation ceased and 64.5 ml of methanol had been collected, the reaction mixture was sampled and the hydroxy value found to be 46.5 at 85.88% solids. The contents of the reactor were then cooled.

EXAMPLE 4-M

Synthesis of carbamate functional polymer from diisobutylene/hydroxypropyl acrylate/butyl methacrylate/styrene/hyroxyethyl methacrylate/butyl acrylate (DIB/HPA/BMA/Sty/HEMA/BA) copolymer (example 4-K). A carbamate-functional copolymer was prepared from the ingredients in Table 15.

TABLE 15

| | Ingredients | Parts by weight (grams) |
|---|---|---|
| Charge 1 | Acrylic/Diisobutylene copolymer solution (Example 4 -K) | 1172.90 |
| | Methyl carbamate | 169.00 |
| | Butyl stannoic acid | 2.40 |
| | Triphenyl phosphite | 2.40 |

A suitable reactor was charged with the above ingredients and equipped with a thermocouple, overhead stirrer, nitrogen inlet and a reflux condenser. The mixture was heated to 144° C. under a nitrogen blanket. At this temperature, the reaction refluxed slightly. The reaction mixture was held for one hour at 145° C. After the hold period was complete, the reflux condenser was removed, and the reactor was equipped for distillation (short column, still head, thermocouple, and receiver flask) at atmospheric pressure. Distillate began to be collected at 145° C. The temperature of the reaction was gradually increased over to 6 hours to 155° C. to maintain a steady rate of distillation. When distillation ceased and 65.6 ml methanol collected, the reaction mixture was sampled and the hydroxy value found to be 59.1 at 88.55% solids. The contents of the reactor were then cooled.

EXAMPLE 5-N

Synthesis of copolymer isobutylene/dimethylaminoethyl methacrylate-alt-hydroxyethyl acrylate/2-ethylhexyl acrylate. The ingredients in Table 16 were used for the polymerization.

TABLE 16

| | Ingredients | Parts by weight (grams) |
|---|---|---|
| Charge 1 | Isobutylene | 500.00 |
| Charge 2 | Di-t-amyl Peroxide | 75.00 |
| Charge 3 | Hydroxyethyl Acrylate | 750.00 |
| | 2-Ethylhexyl Acrylate | 1000.00 |
| | Dimethylaminoethyl methacrylate | 250.00 |
| Charge 4 | 2-butoxy ethanol | 250.00 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at an addition rate of 30.0 grams/hour over 2.5 hours. After 15 minutes charge 3 was added to reactor at an addition rate of ~1000 grams/hour over 2 hours. During the monomer addition the temperature was maintained at 150° C. at 100 PSI. After charge 2 and charge 3 were in the reactor, the reaction mixture was held for 2 hours. The reactor was then cooled to 80° C., and vacuum-stripped for 30 minutes. Charge 4 was added over 15 minutes at 1000 grams/hour. The final solids of the resulting polymer was determined to be 86.49% at 110° C. for one hour. The copolymer had $M_n=2900$ and $M_w/M_n=3.7$. The $^{13}C$ NMR spectrum is consistent with a molar copolymer composition of 20% isobutylene, 30% hydroxyethyl acrylate, 10% dimethylaminoethyl methacrylate and 40% 2-ethylhexyl acrylate.

EXAMPLE 5-N-D

Preparation of an aqueous amine salt dispersion of copolymer isobutylene/dimethylaminoethyl methacrylate-alt-hydroxyethyl acrylate/2-ethylhexyl acrylate. The ingredients in Table 17 were used to make the dispersion.

TABLE 17

| Ingredients | Parts by weight (grams) |
|---|---|
| Deionized water | 1103.4 |
| DMPA | 63.7 |
| Isobutylene/Dimethylaminoethyl methacrylate-alt-Hydroxyethyl acrylate/2-Ethylhexyl acrylate (Example 5-N) | 867.2 |
| Deionized water | 1220.5 |

The ingredients were added sequentially to a suitable vessel under mild agitation. The final solids were 24.9%.

EXAMPLE 5-O

Synthesis of copolymer isobutylene/dimethylaminoethyl methacrylate-alt-hydroxypropyl acrylate/2-ethylhexyl acrylate/ethyl acrylate. The ingredients in Table 18 were used for the polymerization.

TABLE 18

| | Ingredients | Parts by weight (grams) |
|---|---|---|
| Charge 1 | Diisobutylene | 1000.00 |
| Charge 2 | Di-t-amyl Peroxide | 85.70 |
| Charge 3 | Hydroxypropyl Acrylate | 714.30 |

TABLE 18-continued

| Ingredients | Parts by weight (grams) |
| --- | --- |
| 2-Ethylhexyl Acrylate | 714.30 |
| Dimethylaminoethyl methacrylate | 238.10 |
| Ethyl Acrylate | 238.10 |

Charge 1 was added to a 4-liter stirred-stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at addition rate of 34.3 grams/hour over 2.5 hours. After 15 minutes Charge 3 was added to reactor at the addition rate 952.2 grams/hour over 2 hours. During the monomer addition the temperature was maintained at 150° C. at 60 PSI. After charge 2 and charge 3 were in the reactor, the reaction mixture was held for 2 hours. The reactor was then cooled to 25° C. The final solids of the resulting polymer solution was determined to be 76.24% determined at 110° C. for one hour. The copolymer had $M_n=1150$ and $M_w/M_n=2.0$. The $^{13}C$ NMR spectrum is consistent with a copolymer composition of 20% diisobutylene, 30% hydroxypropyl acrylate, 10% dimethylaminoethyl methacrylate, 10% ethyl acrylate, and 30% 2-ethylhexyl acrylate.

EXAMPLE 5-O-D

Preparation of an aqueous amine salt dispersion of copolymer diisobutylene/dimethylaminoethyl methacrylate-alt-hydroxypropyl acrylate/2-ethylhexyl acrylate/ethyl acrylate. The ingredients in Table 19 were used for to make the dispersion.

TABLE 19

| Ingredients | Parts by weight (grams) |
| --- | --- |
| Deionized water | 986.9 |
| DMPA | 63.7 |
| Diisobutylene/Dimethylaminoethyl methacrylate-alt-Hydroxyethyl acrylate/2-Ethylhexyl acrylate/Ethyl acrylate (Example 5-O) | 983.7 |
| Deionized water | 628.0 |

The ingredients were added sequentially to a suitable vessel under mild agitation. The final solids were 30.68%.

EXAMPLE 6-P

Synthesis of copolymer hydroxypropyl acrylate/butyl acrylate (comparative example—no diisobutylene). The ingredients in Table 20 were used for the polymerization.

TABLE 20

| | Ingredients | Parts by weight (grams) |
| --- | --- | --- |
| Charge 1 | Toluene | 500.00 |
| Charge 2 | Di-t-amyl Peroxide | 45.00 |
| Charge 3 | Hydroxypropyl Acrylate | 450.00 |
| | Butyl Acrylate | 1050.00 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at addition rate of 18.00 grams/hour over 2.5 hours. After 15 minutes Charge 3 was added to reactor at an addition rate of 750.00 grams/hour over 2 hours. During the monomer addition the temperature was maintained at 150° C. at 70 PSI. After charge 2 and charge 3 were in the reactor, the reaction mixture was held for 2 hours. The reactor was then cooled to 25° C., and vented. GC analysis of the reaction mixture showed that all acrylates were reacted. The final solids of the resulting polymer were determined to be 76.46% at 110° C. for one hour. The copolymer had Mn=2090 and Mw/Mn=1.9. The 13C NMR spectrum is consistent with a molar copolymer composition of 30% hydroxypropyl acrylate, and 70% butyl acrylate.

EXAMPLE 6-Q

Synthesis of copolymer diisobutylene-alt-hydroxypropyl acrylate/butyl acrylate. The ingredients in Table 21 were used for the polymerization.

TABLE 21

| | Ingredients | Parts by weight (grams) |
| --- | --- | --- |
| Charge 1 | Diisobutylene | 300.00 |
| Charge 2 | Di-t-amyl Peroxide | 90.00 |
| Charge 3 | Hydroxypropyl Acrylate | 855.00 |
| | Butyl Acrylate | 1995.00 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at addition rate of 36 grams/hour over 2.5 hours. After 15 minutes charge 3 was added to reactor at an addition rate of 1425 grams/hour over 2 hours. During the monomer addition the temperature was maintained at 150° C. at 70 PSI. After charge 2 and charge 3 were in the reactor, the reaction mixture was held for 2 hours. The reactor was then cooled to 25° C., and vented. GC analysis of the reaction mixture showed that all acrylates were reacted. The final solids of the resulting polymer was determined to be 96.60% at 110° C. for one hour. The copolymer had $M_n=4090$ and $M_w/M_n=2.3$. The $^{13}C$ NMR spectrum was consistent with a molar copolymer composition of 8.3% diisobutylene, 27.5% hydroxypropyl acrylate, and 64.2% butyl acrylate.

EXAMPLE 6-R

Synthesis of copolymer diusobutylene-alt-hydroxypropyl acrylate/butyl acrylate. The ingredients in Table 22 were used for the polymerization.

TABLE 22

| | Ingredients | Parts by weight (grams) |
| --- | --- | --- |
| Charge 1 | Diisobutylene | 310.00 |
| Charge 2 | Di-t-amyl Peroxide | 45.00 |
| Charge 3 | Hydroxypropyl Acrylate | 382.50 |
| | Butyl Acrylate | 892.5 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at addition rate of 18 grams/hour over 2.5 hours. After 15 minutes charge 3 was added to reactor at the addition rate 637.5 grams/hour over 2 hours. During the monomer addition the temperature was maintained at 150° C. at 40 PSI. After charge 2 and charge 3 were in the reactor, the reaction mixture was held for 2 hours. The reactor was then cooled to 25° C. GC analysis of the reaction mixture showed that all acrylates were reacted. The final solids of the resulting polymer was determined to be 92.60% at 110° C. for one hour. The copolymer had $M_n=2280$ and $M_w/M_n=1.9$. The $^{13}C$ NMR spectrum was consistent with a molar copolymer composition of 15.6% diisobutylene, 25.3% hydroxypropyl acrylate, and 59.1% butyl acrylate.

EXAMPLE 6-S

Synthesis of copolymer diisobutylene-alt-hydroxypropyl acrylate/butyl acrylate. The ingredients in Table 23 were used for the polymerization.

TABLE 23

| Ingredients | | Parts by weight (grams) |
|---|---|---|
| Charge 1 | Diisobutylene | 450.00 |
| Charge 2 | Di-t-amyl Peroxide | 45.00 |
| Charge 3 | Hydroxypropyl Acrylate | 382.50 |
|  | Butyl Acrylate | 892.50 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at an addition rate of 18 grams/hour over 2.5 hours. After 15 minutes charge 3 was added to reactor at an addition rate of 637.5 grams/hour over 2 hours. During the monomer addition the temperature was maintained at 150° C. at 40 PSI. After charge 2 and charge 3 were in the reactor, the reaction mixture was, held for 2 hours. The reactor was then cooled to 25° C. GC analysis of the reaction mixture showed that all acrylates were reacted. The final solids of the resulting polymer was determined to be 89.41% at 110° C. for, one hour. The copolymer had $M_n=2000$ and $M_w/M_n=1.8$. The $^{13}C$ NMR spectrum was consistent with a molar copolymer composition of 21.76% diisobutylene, 23.47% hydroxypropyl acrylate, and 54.77% butyl acrylate.

EXAMPLE 6-T

Synthesis of copolymer diisobutylene-alt-hydroxypropyl acrylate/butyl acrylate. The ingredients in Table 24 were used for the polymerization.

TABLE 24

| Ingredients | | Parts by weight (grams) |
|---|---|---|
| Charge 1 | Diisobutylene | 750.00 |
| Charge 2 | Di-t-amyl Peroxide | 45.00 |
| Charge 3 | Hydroxypropyl Acrylate | 337.50 |
|  | Butyl Acrylate | 787.50 |

Charge 1 was added to a 4-liter stirred stainless steel pressure reactor. The reactor was then pressurized with nitrogen providing a 5 psig pad on the reactor. The agitation on the, reactor was set at 500 rpm and the reactor temperature was adjusted to 150° C. Charge 2 was added to the reactor at addition rate of 18 grams/hour over 2.5 hours. After 15 minutes Charge 3 was added to reactor at the addition rate 562.5 grams/hour over 2 hours. During the monomer addition the temperature was maintained at 150° C. at 55 PSI. After charge 2 and charge 3 were in the reactor, the reaction mixture was held for 2 hours. The reactor was then cooled to 25° C. GC analysis of the reaction mixture showed that all acrylates were reacted. The final solids of the resulting polymer were determined to be 79.48% at 110° C. for one hour. The copolymer had $M_n=1180$ and $M_w/M_n=1.7$. The $^{13}C$ NMR spectrum was consistent with a copolymer composition of 26.30%, diisobutylene, 22.10% hydroxypropyl acrylate, and 51.60% butyl acrylate.

EXAMPLE 7-U

Synthesis of copolymer diisobutylene-alt-hydroxypropyl acrylate/butyl acrylate/acrylic acid. The ingredients in Table 25 were used for the polymerization,

TABLE 25

| Ingredients | | Parts by weight (grams) |
|---|---|---|
| Charge 1 | Diisobutylene | 1000.00 |
| Charge 2 | Di-t-amyl Peroxide | 91.30 |
| Charge 3 | Hydroxypropyl Acrylate | 785.60 |
|  | Butyl Acrylate | 1207.20 |
|  | Acrylic Acid | 50.00 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at addition rate of 36.50 grams/hour over 2.5 hours. After 15 minutes charge 3 was added to the reactor at an addition rate of 1021.4 grams/hour over 2 hours. During the monomer addition the temperature was maintained at 150° C. at 60 PSI. After charge 2 and charge 3 were in the reactor, the reaction mixture was held for 2 hours. The reactor was then cooled to 25° C. GC analysis of the reaction mixture showed that all acrylates were reacted. The final solids of the resulting polymer was determined to be 82.67% at 110° C. for one hour. The copolymer had $M_n=1770$ and $M_w/M_n=2.4$. The $^{13}C$ NMR spectrum was consistent with a molar copolymer composition of 20% diisobutylene, 30% hydroxypropyl acrylate, 2% acrylic acid, and 48% butyl acrylate.

EXAMPLE 7-V

Synthesis of copolymer diisobutylene-alt-hydroxypropyl acrylate/butyl acrylate/acrylonitrile. The ingredients in Table 26 were used for the polymerization.

TABLE 26

| Ingredients | | Parts by weight (grams) |
|---|---|---|
| Charge 1 | Diisobutylene | 1000.00 |
| Charge 2 | Di-t-amyl Peroxide | 91.30 |

TABLE 26-continued

| | Ingredients | Parts by weight (grams) |
|---|---|---|
| Charge 3 | Hydroxypropyl Acrylate | 785.60 |
| | Butyl Acrylate | 1207.20 |
| | Acrylonitrile | 50.00 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at addition rate of 36.50 grams/hour over 2.5 hours. After 15 minutes charge 3 was added to the reactor at an addition rate of 1021.4 grams/hour over 2 hours. During the monomer addition the temperature was maintained at 150° C. at 60 PSI. After charge 2 and charge 3 were in the reactor, the reaction mixture was held for 2 hours. The reactor was then cooled to 25° C. GC analysis of the reaction mixture showed that all acrylates were reacted. The final solids of the resulting polymer was determined to be 82.92% at 110° C. for one hour. The copolymer had $M_n=1940$ and $M_w/M_n=2.3$. The $^{13}C$ NMR spectrum is consistent with a molar copolymer composition of 20% diisobutylene, 30% hydroxypropyl acrylate, 2% acrylonitrile, and 48% butyl acrylate.

EXAMPLE 7-W

Synthesis of copolymer diisobutylene-alt-hydroxypropyl acrylate/butyl acrylate/hydroxyethyl acrylate. The ingredients in Table 27 were used for the polymerization.

TABLE 27

| | Ingredients | Parts by weight (grams) |
|---|---|---|
| Charge 1 | Diisobutylene | 1000.00 |
| Charge 2 | Di-t-amyl Peroxide | 91.30 |
| Charge 3 | Hydroxypropyl Acrylate | 392.80 |
| | Hydroxyethyl Acrylate | 392.80 |
| | Butyl acrylate | 1207.90 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at addition rate of 36.50 grams/hour over 2.5 hours. After 15 minutes charge 3 was added to the reactor at an addition rate of 996.4 grams/hour over 2 hours. During the monomer addition the temperature was maintained at 150° C. at 60 PSI. After charge 2 and charge 3 were in the reactor, the reaction mixture was held for 2 hours. The reactor was then cooled to 25° C. GC analysis of the reaction mixture showed that all acrylates were reacted. The final solids of the resulting polymer were determined to be 81.17% determined at 110° C. for one hour. The copolymer had $M_n=1700$ and $M_w/M_n=2.4$. The $^{13}C$ NMR spectrum is consistent with a copolymer composition of 20% diisobutylene, 15% hydroxypropyl acrylate, 15% hydroxyethyl acrylate, and 50% butyl acrylate.

EXAMPLE 7-X

Synthesis of copolymer diisobutylene/styrene-alt-hydroxypropyl acrylate/butyl acrylate/isobornyl acrylate. The ingredients in Table 28 were used for the polymerization.

TABLE 28

| | Ingredients | Parts by weight (grams) |
|---|---|---|
| Charge 1 | Diisobutylene | 1000.00 |
| Charge 2 | Di-t-amyl Peroxide | 90.00 |
| Charge 3 | Hydroxypropyl Acrylate | 900.00 |
| | Isobornyl Acrylate | 400.00 |
| | Butyl acrylate | 500.00 |
| | Styrene | 200.00 |

Charge 1 was added to a 4-liter stirred stainless steel pressure reactor. The reactor was pressurized with nitrogen providing a 5 psig pad on the reactor. The agitation on the reactor was set at 500 rpm and the reactor temperature was adjusted to 150° C. Charge 2 was added to the reactor at an addition rate of 36 grams/hour over a 2.5 hour period. After 15 minutes Charge 3 was added to reactor at an addition rate of 1000 grams/hour over a 2 hour period. During the monomer addition the temperature was maintained at 150° C. and 60 PSI. After Charges 2 and 3 were in the reactor, the reaction mixture was held for 2 hours. The reactor was than cooled to 25° C. GC analysis of the reaction mixture showed that all acrylates and styrene were reacted. The final solids of the resulting polymer was 83.12% determined at 110° C. for one hour. The copolymer had Mn=1400 and Mw/Mn=2.4. The $^{13}C$ NMR spectrum was consistent with a molar copolymer composition of 22.1% diusobutylene, 35.0% hydroxypropyl acrylate, 15.6% isobornyl-acrylate, 7.8% styrene, and 19.5% butyl acrylate.

EXAMPLE 7-Y

Synthesis of alternating copolymer diisobutylene-alt-hydroxypropyl acrylate/Butyl acrylate/N-butoxymethyl acrylamide. The ingredients in Table 29 were used in polymerization technique.

TABLE 29

| | Ingredients | Parts by weight (grams) |
|---|---|---|
| Charge 1 | Diisobutylene | 100.00 |
| Charge 2 | t-Amylperoxy (2-ethyl hexanoate) | 12 |
| Charge 3 | N-butoxymethyl acrylamide (50% solution in butanol) | 10.00 |
| | Hydroxypropyl Acrylate | 78.50 |
| | Butyl Acrylate | 120.70 |

Charge 1 was added to a reaction flask equipped with an agitator, a thermocouple, and a $N_2$ inlet, placed under a blanket of $N_2$, and heated to 103° C. Charge 2 was added to the reactor over a 2.5 hour period. After 15 minutes. Charge 3 was added to the reactor over a 2 hour period. During the monomer addition the temperature was maintained at 103° C. After Charges 2 and 3 were in the reactor, the reaction mixture was held for 2 hours. The reactor was then cooled to 25° C. GC analysis of the reaction mixture showed that all acrylates and acrylamide were reacted. The reaction flask was then equipped for simple vacuum distillation and the reaction mixture heated to 80° C. to remove the unreacted diisobutylene. The reaction mixture was cooled to 40° C. and 40 grams of Dowanol PM was added to the reaction mixture. The solids of the resulting polymer was 91% (in butyl alcohol) determined at 110° C. for one hour. The copolymer had Mn=4420 and Mw/Mn=3.4. The $^{13}$C NMR spectrum was consistent with a molar copolymer composition of 28% Diisobutylene, 28% Hydroxypropyl acrylate, 2% N-butoxymethyl acrylamide, and 42% Butyl acrylate.

EXAMPLE 7-Z

Synthesis of alternating copolymer diisobutylene-alt-hydroxypropyl acrylate/butyl acrylate/poly(ethylene glycol) methyl ether acrylate. The ingredients in Table 30 were used in the polymerization technique.

TABLE 30

| | Ingredients | Parts by weight (grams) |
|---|---|---|
| Charge 1 | Diisobutylene | 100.00 |
| Charge 2 | t-Amylperoxy(2-ethyl hexanoate) | 12 |
| Charge 3 | Poly(ethylene glycol) methyl ether acrylate | 5.00 |
| | Hydroxypropyl Acrylate | 78.50 |
| | Butyl Acrylate | 120.70 |

Charge 1 was added to a reaction flask equipped with an agitator, a thermocouple, and a $N_2$ inlet, placed under a blanket of $N_2$, and heated to 103° C. Charge 2 was added to the reactor over a 2.5 hour period. After 15 minutes Charge 3 was added to the reactor over a 2 hour period. During the monomer addition the temperature was maintained at 103° C. After Charges 2 and 3 were in the reactor, the reaction mixture was held for 2 hours. The reactor was than cooled to 25° C. GC analysis of the reaction mixture showed that all acrylates were reacted. The solids of the resulting polymer were 78.4% determined at 110° C. for one hour. The copolymer had Mn=5230 and Mw/Mn=1.9. The $^{13}$C NMR spectrum was consistent with a molar copolymer composition of 26% diisobutylene, 25% hydroxypropyl acrylate, 2% poly(ethylene glycol) methyl ether acrylate, and 47% butyl acrylate.

EXAMPLE 8-AA

Synthesis of alternating copolymer diisobutylene-alt-methyl acrylate/butyl acrylate. The ingredients in Table 31 were used in the polymerization technique.

TABLE 31

| | Ingredients | Parts by weight (grams) |
|---|---|---|
| Charge 1 | Diisobutylene | 336.00 |
| Charge 2 | t-Amylperoxy(2-ethyl hexanoate) | 12 |
| Charge 3 | Methyl acrylate | 21.50 |
| | Butyl Acrylate | 128.00 |

Charge 1 was added to a reaction flask equipped with an agitator, a thermocouple, and a $N_2$ inlet, placed under a blanket of $N_2$, and heated to 103° C. Charge 2 was added to the reactor over a 4.5 hour period. After 15 minutes Charge 3 was added to the reactor over a 4 hour period During the monomer addition the temperature was maintained at 103° C. After Charges 2 and 3 were in the reactor, the reaction mixture was held for 2 hours. The reactor was than cooled to 25° C. GC analysis of the reaction mixture showed that all acrylates were reacted. The reaction flask was then equipped for simple vacuum distillation and the reaction mixture heated to 80° C. to remove the unreacted diisobutylene. The reaction mixture was cooled to 40° C. and 60 grams of Dowanol PM was added. The solids of the resulting polymer were 75.6% determined at 110° C.; for one hour. The copolymer had $M_{n}=1530$ and $M_{w}/M_{n}=3.2$. The $^3$C NMR spectrum was consistent with a molar copolymer composition of 39.4% diisobutylene, 11.5% methyl acrylate, and 49.1% butyl acrylate.

EXAMPLE 8-BB

Synthesis of alternating copolymer diisobutylene-alt-isobornyl acrylate/butyl acrylate. The ingredients in Table 32 were used in the polymerization technique.

TABLE 32

| | Ingredients | Parts by weight (grams) |
|---|---|---|
| Charge 1 | Diisobutylene | 224.00 |
| Charge 2 | t-Amylperoxy(2-ethyl hexanoate) | 12 |
| Charge 3 | Isobornyl acrylate | 104.2 |
| | Butyl Acrylate | 64.1 |

Charge 1 was added to a reaction flask equipped with an agitator, a thermocouple, and a $N_2$ inlet, placed under a blanket of $N_2$, and heated to 103° C. Charge 2 was added to the reactor over a 3.5 hour period. After 15 minutes Charge 3 was added to the reactor over a 3 hour period. During the monomer addition the temperature was maintained at 103° C. After Charges 2 and 3 were in the reactor, the reaction mixture was held for 2 hours. The reactor was then cooled to 25° C. GC analysis of the reaction mixture showed that all acrylates were reacted. The reaction flask was then equipped for simple vacuum distillation, the reaction mixture was heated to 80° C. to remove the unreacted diisobutylene. The reaction mixture was cooled to 40° C. and 60 grams of Dowanol PM was added. The solids of the resulting polymer were 72.9% determined at 110° C. for one hour. The copolymer had $M_{n}=1880$ and $M_{w}/M_{n}=2.0$. The $^{13}$C NMR spectrum was consistent with a molar copolymer composition of 31.8,% Diisobutylene, 35.5% Isobornyl acrylate and 32.7% Butyl acrylate.

EXAMPLE 8-CC

Synthesis of alternating copolymer diisobutylene-alt-acrylic acid. The ingredients in Table 33 were used in the polymerization technique.

TABLE 33

| | Ingredients | Parts by weight (grams) |
|---|---|---|
| Charge 1 | Dowanol PM | 500.00 |
| | Diisobutylene | 896.00 |
| Charge 2 | t-Amylperoxy(2-ethyl hexanoate) | 24 |
| Charge 3 | Acrylic acid | 400.00 |

Charge 1 was added a reaction flask equipped with an agitator, a thermocouple, and a $N_2$ inlet, placed under a blanket of $N_2$, and heated to 103° C. Charge 2 was added to the reactor over a 3.5 hour period. After 15 minutes Charge 3 was added to the reactor over a 3 hour period. During the monomer addition the temperature was maintained at 103° C. After Charges 2 and 3 were in the reactor, the reaction mixture was held for 2 hours. The reactor was than cooled to 25° C. GC analysis of the reaction mixture showed that the acrylic acid was completely reacted. The reaction flask was than equipped for simple vacuum distillation and the reaction mixture heated to 80° C. to remove unreacted diisobutylene and solvent. The solids of the resulting polymer were 99.1% determined at 110° C. for one hour. The copolymer had $M_n=1860$ and $M_w/M_n=2.4$. The $^{13}C$ NMR spectrum was consistent with a molar copolymer composition of 40% Diisobutylene and 60% Acrylic acid.

EXAMPLE 8-DD

This example describes the preparation of a diisobutylene/styrene/glycidyl acrylate/hydroxypropyl acrylate alternating copolymer. The copolymer was prepared as described below from the ingredients in Table 34:

TABLE 34

| Ingredients | Parts by weight (grams) |
| --- | --- |
| Diisobutylene | 1000 |
| n-Methoxypropanol[1] | 700 |
| Styrene | 330 |
| Glycidyl acrylate | 120 |
| Hydroxypropyl acrylate | 150 |
| t-Amyl peroxy-2-ethylhexanoate | 34 |
| t-Amyl peroxy-2-ethylhexanoate | 8 |
| t-Amyl peroxy-2-ethylhexanoate | 12 |

[1]DOWANOL ® PM solvent, Dow Chemical Co., Midland MI

The diisobutylene and n-methoxypropanol were charged to a reaction vessel capable of holding pressure consistent with the reaction conditions. This mixture was then heated to reflux, approximately 100° C. A mixture of styrene, glycidyl acrylate, and hydroxypropyl acrylate was added over a period of 3 hours. At the same time, the first charge of t-amyl peroxy-2-ethylhexanoate was added over 3 hours. After the additions the copolymer was held for 2 hours at reflux. A sample for solids was used to determine whether the reaction was complete. After the hold period, 8 grams of t-amyl peroxy-2-ethylhexanoate was added, and the reaction held for 8 hours. A second addition of 12 grams t-amyl peroxy-2-ethylhexanoate followed, and the reaction held an additional 5 hours at reflux. At that point, the reaction had reached the theoretical non-volatile content of 47.3%. The unreacted diisobutylene was then removed under vacuum at 90–95° C. The final product was filtered through a 5 micron bag.

EXAMPLE 8-EE

This example describes the preparation of a sulfonium group-containing diisobutylene/acrylic resin from a diisobutylene/hydroxypropyl acrylate/glycidyl methacrylate/2-ethylhexyl acrylate alternating co-polymer using di-tert-amyl peroxide as an initiator. The starting copolymer was prepared as described below from the ingredients in Table 34A.

TABLE 34A

| Ingredients | Parts by weight (grams) |
| --- | --- |
| Diisobutylene | 1000 |
| Di-tert-Amyl Peroxide | 45 |
| Hydroxypropyl Acrylate | 300 |
| Glycidyl Methacrylate | 300 |
| 2-Ethylhexyl Acrylate | 1400 |

The diisobutylene was charged to a reaction vessel capable of holding pressure consistent with the reaction conditions. The diisobutylene was heated to 150° C. The di-tert-amyl peroxide was added over 2.5 hours. 15 Minutes after starting the di-tert-amyl peroxide addition, the hydroxypropyl acrylate, glycidyl methacrylate, and 2-ethylhexyl acrylate, previously combined and mixed, was added over 2.0 hours. After the additions were complete the copolymer was held at 150° C. for 2.0 hours then cooled to ambient temperature. The polymer was found to have an epoxy equivalent weight of 1650. Percent non-volatile was measured to 75% with residual non-volatiles consisting of diisobutylene and decomposition products from the initiator. The sulfonium functional resin was prepared as described below from the ingredients in Table 34B.

TABLE 34B

| Ingredients | Parts by Weight (grams) |
| --- | --- |
| Starting copolymer of Table 34A | 771.5 |
| Thiodiethanol | 122.0 |
| Deionized Water | 27.0 |
| Lactic Acid | 40.9 |
| Deionized Water | 884.5 |
| Deionized Water | 572.2 |

The diisobutylene-acrylic copolymer of Table 34A was charged to a reaction vessel and heated to 80° C. Thiodiethanol, the first charge of deionized water, and lactic acid were then added to the reaction vessel. The reaction mixture was then held at 80° C. After five hours, an acid value of 6.5 and a sulfonium level of 0.185 meq/g were obtained. At this point the resin was dispersed with agitation into the second charge of deionized water which was at 25° C. After mixing for 30, minutes the dispersion was reduced to the proper solids with the final charge of deionized water. The dispersion had a non-volatile content of 25%.

EXAMPLE 9

This example set describes the preparation of electrodepositable coating compositions in the form of electrodeposition baths. The electrodepositable coating compositions were prepared as described below using the ingredients in Table 35.

TABLE 35

| | Parts by weight (grams) | | |
| --- | --- | --- | --- |
| Ingredient | Example 9 (Comparative) | Example 9-N | Example 9-O |
| E8003[1] | 817.0 | 735.3 | 735.3 |
| Amine salt dispersion of Example 5-N-D | | 128.8 | |

TABLE 35-continued

| Ingredient | Parts by weight (grams) | | |
|---|---|---|---|
| | Example 9 (Comparative) | Example 9-N | Example 9-O |
| Amine salt dispersion of Example 5-O-D | | | 108.5 |
| E8008[2] | 230.7 | 230.7 | 230.7 |
| Deionized water | 2752.4 | 2725.6 | 2725.6 |

[1] A cationic polyurethane resin available from PPG Industries, Inc.
[2] A pigment paste available from PPG Industries, Inc.

The E8003 cationic polyurethane was combined with 500.0 grams of the deionized water and stirred thoroughly. The cationic additives of Examples N and O were combined with, 300.0 grams of the deionized water and stirred. This solution was then added to the reduced cationic polyurethane. Finally, the E8008 pigment paste was reduced with the remaining amount of deionized water, then added to the resin mixture under agitation.

The electrodepositable coating compositions were evaluated for oil-spot resistance. The purpose of this procedure is to measure a coatings resistance to visible defects such as craters, caused by surface oil contamination. The substrate used in this procedure was 4"×12" zinc phosphated cold rolled steel panels available as APR 28630 from ACT Laboratories, Inc., Hillsdale, Mich. The substrate was first electrocoated using ED7951 (a conductive black coating available from PPG Industries, Inc.) applied @ 0.75 mil. This first coat was cured for 25 minutes at 375° F. Three conveyor oils were used to test the oil-spot resistance of the electrodepositable coatings:

1. Moluballoy ICO Oil (ICO) chain oil from TRIBOL CORP., Sterling Heights, Mich.
2. Lubercon Series I (LUB) chain oil from LUBERCON MAINTENANCE, Fremont, Mich.
3. P80—a light transportation oil from Germany.

Prior to preparing the panels, the bath compositions were warmed to the coat out temperature of 90° F. The panel to be tested was placed on the bench, laying a divider on the panel, which divides the panel surface into three sections protected from one another. A toothbrush was dipped into the ICO oil, excess oil blotted off with a paper towel, and the oil gently flicked over the top section of the panel to give a spattered pattern of small droplets. The LUB oil was applied in a similar manner onto the middle section, and the P80 light transportation oil was applied to the bottom third of the panel. A separate toothbrush was used for each oil. The prepared panel was then placed immediately into the bath composition being tested and the electrodepositable composition was applied. Electrodeposition was carried out at 180 volts for 135 seconds. The test panels were cured for 30 minutes at 350° F. These conditions yielded approximately 1.4 mils of cured film. The panels were then visually inspected for defects and rated versus the comparative example (comparative rating=0). Results are shown in Table 36.

TABLE 36

| Bath | ICO | LUB | P80 |
|---|---|---|---|
| Example 9 Comparative | 0 | 0 | 0 |
| Example 9-N | ++ | ++ | ++ |
| Example 9-O | ++ | ++ | ++ |

These examples demonstrate the use the alternating copolymers of the present invention in an electrodeposition coating composition.

EXAMPLE 10

A waterborne basecoat was prepared using two component parts, an organic mix and an aqueous mix as shown in Table 37. The organic mix was prepared by mixing each component to uniformity. Similarly, the aqueous mix was prepared by mixing each component to uniformity. The organic mix was then added to the aqueous mix with agitation. The premix and adjustment mix were prepared by mixing the components and adding them both to the combination of the organic mix and the aqueous mix to form a waterborne basecoat coating. The pH of the coating was adjusted to 8.5. The Viscosity was adjusted to 25 seconds measured on a #4 Ford cup at room temperature (71°–72° F.).

TABLE 37

| Material | Example A (grams) | Example B (grams) | Example C (grams) |
|---|---|---|---|
| Organic Mix | | | |
| Melamine[1] | 25.0 | 25.0 | 25.0 |
| Melamine[2] | 6.3 | 6.3 | 6.3 |
| Light Stabilizer[3] | 1.4 | 1.4 | 1.4 |
| Pigment Paste[4] | 23.5 | 23.5 | 23.5 |
| Pigment Paste[5] | 6.5 | 6.5 | 6.5 |
| Phosphatized Epoxy[6] | 0.4 | 0.4 | 0.4 |
| N-butoxy propanol | 45.0 | 45.0 | 45.0 |
| Aqueous mix | | | |
| Mineral Spirits[7] | 6.0 | 6.0 | 6.0 |
| Styrene-Acrylic Resin[8] | 132.1 | | |
| Latex Polyester* | | 140.0 | |
| Polymer of Example 2-D | | | 71.1 |
| D.I. water | 50.0 | 50.0 | 50.0 |
| Waterborne acrylic dispersion[9] | 23.1 | 23.1 | 23.1 |
| 50 wt. % DMEA in D.I. water | 4.5 | 4.5 | 4.5 |
| Pre-mix | | | |
| D.I. water | 10.0 | 10.0 | 10.0 |
| 50 wt. % DMEA in D.I. water | 4.5 | 4.5 | 4.5 |
| Oligomeric Polyester | 5.0 | 5.0 | 5.0 |
| Adjustment Mix | | | |
| D.I. water | 43.0 | 43.0 | 43.0 |
| 50 wt. % DMEA in D.I. water | 1.1 | 1.1 | 1.1 |

*Latex example III of U.S. Pat. No. 6,281,272 to Baley et al.
[1] Cymel® 303, Cytec Industries, West Patterson, NJ
[2] Cymel® 385, Cytec Industries
[3] Tinuvin® 1130, CGL-1130, Ciba Specialty Chemicals, Basel, Switzerland
[4] Aqua Paste® 3620-D23, Silberline Manufacturing, Tamaqua, PA
[5] Aqua Paste® 3700-A23, Silberline Manufacturing
[6] Epon 880 type, 17% phosphoric acid, 83% liquid epoxy, 56% solids in 92/4/4 w/w EGME, xylene and D.I. water available from Akzo Nobel Chemicals, Arnhem, the Netherlands
[7] Shell Sol® 71, Shell Chemicals, Houston, TX
[8] Joncryl® 540, S. C. Johnson & Son, Inc. Racine, WI
[9] Waterborne acrylic dispersion of 8.5/18/30/35/8.5 m/m HEA/nBMA/Styr/nBA/AA, 27 wt. % in 2/16/1/81 w/w DMEA/DGME/mineral spirits/D.I. water
[10] Oligomeric polyester prepared as described in U.S. Pat. No. 5,356,973 to Taljan et al., Example A.

The film forming compositions of examples A, B, and C were applied over electrodeposition primer coated steel panels (cold rolled steel panels 4"×12", available as APR4128 from ACT Laboratories, Inc. Hillsdale, Mich.).

The basecoat compositions of were spray applied (2 coats automated spray with 30 seconds ambient flash between coats) at 60% relative humidity and 21° C., to give a dry film thickness of 15 μm. The panels were baked horizontally for 5 minutes at 80° C. The base coated panels were top coated with a clear isocyanate system (as WTKR-2000, available from PPG Industries, Inc., Pittsburgh, Pa.) air flashed for 10 minutes and baked for 30 minutes at 140° C. to give a film thickness of. 40 to 42 μm.

The appearance and physical properties of the coated panels were measured using the following tests with the results shown in Table 38:

20° Gloss—Specular gloss was measured at 20° with a Novo Gloss Statistical Glossmeter (Paul N. Gardner Company, Inc., Pompano Beach, Fla.) where higher numbers indicate better performance.

DOI (Distinction of Image)—measured using a Dorigon II (Hunter Laboratories) were higher numbers indicate better performance.

Adhesion—adhesion of the coating to the substrate was measured using a multiblade cutter available from Paul N. Gardner Company Inc., with 2.0 mm spaced teeth to scribe 2 sets of lines perpendicular to each other, both one inch long. The crosshatch area was taped using tape (#898, 3M, St. Paul, Minn.) to eliminate any damage. A rating of 10 is best (ASTM test method #D3359)

Chip—chip resistance was measured by the Erichsen chip method (PPG STM-0802, 2×2000 g, 30 psi) with a rating of 10 being best.

TABLE 38

| Test | Coating | | |
|---|---|---|---|
| | Ex. A | Ex. B | Ex. C |
| 20° Gloss | 85 | 92 | 86 |
| DOI | 75 | 73 | 83 |
| Adhesion | 10 | 10 | 10 |
| Chip | 6 | 9 | 9− |

The data demonstrate that good coating properties that result when the coating composition of the present invention is used as a waterborne basecoat.

EXAMPLE 11

Clearcoat

This example demonstrates the use of the present coating composition in a melamine crosslinked clearcoat system.

Each component in Table 39 was mixed sequentially with agitation. The final viscosity was adjusted with 1/1/1 w/w Aromatic 100 (ExxonMobil)/methyl n-amyl ketone/xylene and 4/1 w/w methyl n-amyl ketone/2-butoxy ethanol acetate to 27 seconds measured on a #4 Ford cup (Paul N. Gardner Company) at room temperature (71°–72° F.).

TABLE 39

| Material | Example D (grams) | Example E (grams) | Example F | Example G (grams) |
|---|---|---|---|---|
| MAK | 7.3 | 7.3 | 7.3 | 7.3 |
| Xylene | 2.2 | 2.2 | 2.2 | 2.2 |
| Aromatic 100[11] | 7.5 | 7.5 | 7.5 | 7.5 |
| EGMHE | 0.7 | 0.7 | 0.7 | 0.7 |
| Ethanol | 3.3 | 3.3 | 3.3 | 3.3 |
| Amino Resin[12] | 49.9 | | | |

TABLE 39-continued

| Material | Example D (grams) | Example E (grams) | Example F | Example G (grams) |
|---|---|---|---|---|
| Amino Resin[13] | | 40.0 | 40.0 | 40.0 |
| Acrylic Resin** | 73.8 | | | |
| Polymer of Example 1-A | | 71.7 | | |
| Polymer of Example 1-B | | | 60.0 | |
| Polymer of Example 1-C | | | | 60.0 |
| Catalyst[14] | 1.0 | 1.4 | 1.2 | 1.2 |
| Aromatic 100[11] | 11.0 | 10.0 | 3.3 | 3.3 |
| MAK | 11.0 | 10.0 | 3.3 | 3.3 |
| Xylene | 11.0 | 10.0 | 3.3 | 3.3 |
| MAK | 16.8 | 24.0 | 1.5 | 2.5 |
| Butyl acetate | 4.2 | 6.0 | 1.5 | 2.5 |

**Prepared in 10/46/44 w/w isobutyl alcohol/Aromatic 100/xylene using 2,2'-azobis-(2-methyl butyronitrole) (Vazo-67, DuPont). Monomer composition m/m 40% HPA, 1.0% MMA, 19% NBA, 18% NBMA, 20% Styr, 2% AA; 71 wt. % polymer solids.
[11]Exxon Mobile Corp., Fairfax, VA
[13]Resimene ® 757, Solutia, St. Louis. MO
[13]Resimene ® 755, Solutia
[14]Cycat ® Catalyst 600, Cytec Industries (dodecylbenzyl sulfonic acid)

The clear coating compositions shown in Table 40 were applied using an 8-path Wet Film Applicator, #14 available from Paul N. Gardner Company, Inc., to black electrodeposition primed panels (cold rolled steel panels 4"×12", available as APR28215 from ACT Laboratories, Inc.) at ambient temperature. The dry film thickness was targeted for about 30 μm (1.6 mils). The coated panels were baked for 30 minutes at 141° C.

Physical properties were measured as outlined above except where noted below.

Knoop hardness is measured using the Tukon Microhardness Instrument Model 300 (Wilson Instruments Division of Instron Corporation, Canton, Mass.), higher numbers indicate better performance.

Mar—tested by subjecting the coated panels to scratch testing by linearly scratching the coated surface with a weighted abrasive paper for ten double rubs using an Atla ATCC Scratch Tester, Model CM-5 (Atlas Electrical Devices Company, Chicago, Ill.). The abrasive paper used was 281Q WETORDRY™ PRODUCTION™ 9 micron polishing paper sheets (3M). Panels were then rinsed with tap water and carefully patted dry with a paper towel. The 20° gloss was measured as outlined above on the scratched area of each test panel. The lowest 20° gloss reading from the scratched area is used. The scratch results are reported as 20° mar gloss and the percent of the, initial gloss retained after scratch testing using the following calculation:

(100×mar gloss)/initial gloss. Higher values for percent of gloss retained are desirable.

Acid Etch—resistance to etching is measured by the Sulfuric Acid Etch Droplet Test. A dilute solution of sulfuric acid and deionized water is applied in droplet form to the cured coating surface and baked for a specified time and temperature, this can be repeated two times. Panels are washed with tap water, and patted dry with a paper towel. The acid etch is rated on a scale of (0 to 10), with 0 referring to no visible etching.

VOC—The determination of the volatile organic compound content (VOC) was done using (ASTM D3960).

Craters—the crater robustness of the clear topcoats was measured by observing dewetting behavior over a steel panel covered with a series of known resin contaminants (PPG STM-0868). Clear topcoats were spray applied to these panels and baked for 30 minutes at 141° C., higher numbers are better when panels are rated.

TABLE 40

| Test | Coating | | | |
|---|---|---|---|---|
| | Ex. D | Ex. E | Ex. F | Ex. G |
| 20° Gloss | 92 | 87 | 86 | 87 |
| Tukon (Knoop Hardness) | 14 | 10 | 12 | 10 |
| Mar Retention (%) | 75 | 52 | 15 | 56 |
| Total Solids (wt. %) | 53 | 51 | 52 | 64 |
| Acid Etch Rating | 10 | 10 | 3 | 10 |
| VOC | 3.9 | * | 3.3 | 2.9 |
| Craters | 1− | * | 47.5 | * |

* Not tested

The data demonstrate that good coating properties that result when the coating composition of the present invention is used in a melamine crosslinked clearcoat system.

EXAMPLE 12

Clearcoat

This example demonstrates the use of the present coating composition in an isocyanate crosslinked clearcoat system.

Each component in Table 41 was mixed sequentially with agitation. The final viscosity was adjusted to 27 seconds measured on a #4 Ford cup at room temperature (71°–72° F.)

TABLE 41

| Material | Example H (grams) | Example I (grams) | Example J | Example K (grams) |
|---|---|---|---|---|
| 3-Ethoxy propionate | 17.6 | | | |
| MEPGA | 9.3 | | | |
| Acrylic Resin** | 68.3 | | | |
| Polymer of Example 1-A | | 99.9 | | |
| Polymer of Example 1-B | | | 60.7 | |
| Polymer of Example 1-C | | | | 57.9 |
| Polyisocyanate[15] | 47.6 | | | |
| Polyisocyanate[16] | | 23.5 | 56.2 | 60.1 |
| Dibutyltin dilaurate | 0.05 | 0.05 | 0.05 | 0.05 |
| 3-Ethoxy propionate | 5.0 | 26.0 | 21.0 | 27.0 |
| MEPGA | 5.0 | 16.0 | 21.0 | 27.0 |

**as described in Table 32
[15]Desmodur ® N-3390, Bayer Inc., Pittsburgh, PA
[16]Desmodur ® Z-4470, Bayer Inc.

The test panels and physical properties in Table 42 were determined as described in coating example 11.

TABLE 42

| Test | Coating | | | |
|---|---|---|---|---|
| | Ex. H | Ex. I | Ex. J | Ex. K |
| 20° Gloss | 86 | 82 | 88 | 80 |
| Tukon (Knoop Hardness) | 13 | 15 | 10 | 13 |
| Mar Retention (%) | 18 | 9 | 72 | 10 |
| Total Solids (wt. %) | 52 | 63 | 63 | 58 |
| Acid Etch Rating | 4 | 1 | 10 | 1 |

TABLE 42-continued

| Test | Coating | | | |
|---|---|---|---|---|
| | Ex. H | Ex. I | Ex. J | Ex. K |
| VOC | 3.9 | * | 3.3 | * |
| Craters | 1− | * | 47.5 | * |

* Not tested

The data demonstrate that good coating properties that result when the coating composition of the present invention is used in an isocyanate crosslinked clearcoat system.

EXAMPLE 13

Clearcoat

This example demonstrates the use of the present coating composition in an aminoplast crosslinked clearcoat system.

Each component in Table 43 was mixed sequentially with agitation to form a clearcoat coating. The Clearcoat formulations were reduced, with a 4:1 w/w mixture of methyl ethyl ketone and 2-butoxy ethanol acetate to a 33±1 #4 Ford cup viscosity at room temperature (71°–72° F.).

TABLE 43

| Material | Ex. L (g) | Ex. M (g) | Ex. N (g) | Ex. O (g) | Ex. P (g) | Ex. Q (g) |
|---|---|---|---|---|---|---|
| Xylene | 2.3 | 2.3 | 2.3 | 2.3 | 2.3 | 2.3 |
| Aromatic 100[11] | 8.5 | 8.5 | 8.5 | 8.5 | 8.5 | 8.5 |
| EGMHE | 0.6 | 0.6 | 0.6 | 0.6 | 0.6 | 0.6 |
| Methyl Ethyl Ketone | 8.5 | 8.5 | 8.5 | 8.5 | 8.5 | 8.5 |
| Light Stabilizer[17] | 1.5 | 1.5 | 1.5 | 1.5 | 1.5 | 1.5 |
| Light Stabilizer[18] | 1.5 | 1.5 | 1.5 | 1.5 | 1.5 | 1.5 |
| Fumed Silica Dispersion | 16.2 | 16.2 | 16.2 | 16.2 | 16.2 | 16.2 |
| Amino Resin[12] | 47.0 | 47.0 | 47.0 | 47.0 | 47.0 | 47.0 |
| Ethanol | 5.5 | 5.5 | 5.5 | 5.5 | 5.5 | 5.5 |
| Acrylic Resin*** | 68.6 | | | | | |
| Polymer of Example 4-I | | 59.3 | | | | |
| Polymer of Example 4-J | | | 56.7 | | | |
| Polymer of Example 4-K | | | | 55.6 | | |
| Polymer of Example 4-L | | | | | 56.8 | |
| Polymer of Example 4-M | | | | | | 55.0 |
| Light Stabilizer[19] | 0.4 | 0.4 | 0.4 | 0.4 | 0.4 | 0.4 |
| Flow Additive[20] | 0.7 | 0.7 | 0.7 | 0.7 | 0.7 | 0.7 |
| Flow Additive[21] | 0.5 | 0.5 | 0.5 | 0.5 | 0.5 | 0.5 |
| Catalyst[14] | 0.9 | 0.9 | 0.9 | 0.9 | 0.9 | 0.9 |

***Resin composition m/m 40% HPA/18% NBMA/19% NBA/20% Styr/ 2% AA/1% MMA
[11]Exxon Mobile Corp., Fairfax, VA.
[12]Resimene ® 757, Solutia, Inc., St. Louis. MO
[14]Cycat ® Catalyst 600, Cytec Industries(dodecylbenzyl sulfonic acid)
[17]Chisorb 328, Chitec Chemical Co., Taipei Taiwan
[18]Tinuvin ® 900, Ciba Specialty Chemicals
[19]Tinuvin ® 292, Ciba Specialty Chemicals
[20]Multiflow, available from Solutia, Inc.
[21]PBA (polybutyl acrylate), available from E. I. du Pont de Nemours and Company The film-forming compositions of Examples L–Q were applied to pigmented basecoats to form color plus clear composite coatings over a steel substrate with electrodeposition primer and primer surfacer. The basecoat used for the examples was ODCT6373. (black), available from PPG Industries, Inc. The primer used was FCP-6759, commercially available from PPG Industries, Inc. The electrodeposition primer used on the steel was ED5000, commercially available from PPG Industries, Inc.

The basecoat was spray applied in two coats to the electrodeposition primed steel panels at a temperature of about 75° F. (24° C.). An Approximately 60 second flash time was allowed between the two basecoat applications. After the second basecoat application, a 90 seconds flash time was allowed at about 75° F. (24° C.) before the application of the clear coating composition. The clear coating compositions of Examples L–Q were each applied to a basecoated panel in two coats with a 60 second flash time at 75° F. (24° C.) allowed between coats. The composite coating was allowed to air flash at about 75° F. (24° C.) for 8–10 minutes before baking at 285° F. (141° C.) to cure both the basecoat and the clearcoat. The panels were baked in a horizontal position. The colored panel for each clearcoat example was baked for 30 minutes and used to test for physical properties. The physical property data is shown in Table 44.

TABLE 44

| Test | Coating | | | | | |
|---|---|---|---|---|---|---|
| | Ex. L | Ex. M | Ex. N | Ex. O | Ex. P | Ex. Q |
| 20° Gloss | 90 | 86 | 88 | 88 | 89 | 87 |
| DOI | 90 | 95 | 92 | 92 | 90 | 89 |
| Tukon (Knoop Hardness) | 12 | 8 | 10 | 11 | 11 | 11 |
| Mar Retention (%) | 96 | 91 | 94 | 99 | 98 | 95 |
| Total Solids (wt. %) | 57 | 66 | 59 | 59 | 59 | 59 |
| Acid Etch Rating | 10 | * | 10 | 10 | 2 | 4 |

* Not tested

The data demonstrate that good coating properties that result when the coating composition of the present invention is used in an amino crosslinked clearcoat system.

EXAMPLE 14

Basecoat

This example demonstrates the use of the present coating composition in an aminoplast crosslinked basecoat system.

Each component in Table 45 was mixed sequentially with agitation to form a basecoat coating. The basecoats of Examples R–U were reduced with a 1:1 w/w/mixture of Xylene and Aromatic 100 (Exxon Mobile Corp) to a spray viscosity of 18, at ambient temperature (76° F.), with a # 4 Ford cup.

TABLE 45

| Material | Ex. R (g) | Ex. S (g) | Ex. T (g) | Ex. U (g) |
|---|---|---|---|---|
| DIBK | 55.1 | 55.1 | 55.1 | 55.1 |
| Xylene | 55.1 | 55.1 | 55.1 | 55.1 |
| Methyl Ethyl Ketone | 18.8 | 18.8 | 18.8 | 18.8 |
| N-butyl acetate | 17.6 | 17.6 | 17.6 | 17.6 |
| Light Stabilizer[24] | 10.6 | 10.6 | 10.6 | 10.6 |
| Microgel[25] | 87.0 | 87.0 | 87.0 | 87.0 |
| Amino Resin[12] | 171.0 | 171.0 | 171.0 | 171.0 |
| Polymer of Example 3-H | 91.9 | | | |
| Polymer of Example 3-E | | 84.8 | | |
| Polymer of Example 3-F | | | 89.8 | |
| Polymer of Example 3-G | | | | 84.8 |
| Bentonite Dispersion | 87.3 | 87.3 | 87.3 | 87.3 |

TABLE 45-continued

| Material | Ex. R (g) | Ex. S (g) | Ex. T (g) | Ex. U (g) |
|---|---|---|---|---|
| Phosphatized Epoxy Polymer Solution | 1.2 | 1.2 | 1.2 | 1.2 |
| Catalyst[14] | 5.7 | 5.7 | 5.7 | 5.7 |
| Magenta Pigment Paste | 42.4 | 42.4 | 42.4 | 42.4 |
| Red Pigment Paste | 134.8 | 134.8 | 134.8 | 134.8 |
| Orange Mica[26] | 1.2 | 1.2 | 1.2 | 1.2 |
| Copper Mica[27] | 6.9 | 6.9 | 6.9 | 6.9 |
| Russet Mica[28] | 32.0 | 32.0 | 32.0 | 32.0 |
| Aluminum Paste[29] | 1.3 | 1.3 | 1.3 | 1.3 |

[12]Resimene ® 757, Solutia, Inc., St. Louis. MO
[14]Cycat ® Catalyst 600, Cytec Industries (dodecylbenzyl sulfonic acid)
[24]Tinuvin ® 328, Ciba Specialty Chemicals
[25]Prepared as described in example 2 of U.S. Pat. No. 4,147,688 to Makhlouf et al.
[26]Super Bright Orange Mica, Englehard Corp., Iselin, NJ
[27]Fine Copper Mica, Englehard Corp.
[28]Russet Mica, EM Industries, Inc., Hawthorne, NJ
[29]Fine Aluminum Paste, Silberline Manufacturing The compositions of Examples R–U were spray applied under a clearcoat and over primed and electrodeposition coated steel panels to form a color-plus-clear composite coatings. The panels used were 4"×12" cold rolled steel panels (APR40026, available from ACT Laboratories, Inc.) coated with electrodeposition coating ED5240, available from PPG Industries, Inc. The test panels were coated with FCP6519 primer surfacer available from PPG Industries, Inc. The basecoats of examples R–U were automated spray applied in two coats to the primed and electrodeposition coated steel panels at 76° F. and at 27% relative humidity. A dry film thickness of about 18 to 20 (0.7–0.8 mils) was targeted. The basecoat was allowed to flash at ambient temperature about 10 to 15 minutes.

The clear coating applied over the basecoat compositions of Examples R–U was ODCT8000 carbamate clearcoat, available from PPG Industries, Inc. The dry film thickness of the clearcoat was targeted for 46 to 51 μm (1.8–2 mils). The clearcoat was allowed to air flash at ambient temperature for 10 to 15 minutes. Panels prepared from each coating were baked for 30 minutes at 285° F. (141° C.) in a horizontal position.

The physical properties of the coated panels were measured using the tests outlined below with the results shown in Table 46:

20° Gloss—Initial 20 degrees gloss was measured with a Haze-Gloss Metter (Byk-Gardner USA, Columbia, Md.), where higher numbers indicate better performance.

Mar was tested by subjecting the coated panels to scratch testing by linearly scratching the coated surface with a weighted abrasive paper for ten double rubs using an Atlas AA TCC Crockmeter, Model CM-5 (Atlas Electrical Devices Company, Chicago, Ill.). The abrasive paper used was 281 Q WETORDRY Production 2 micron polishing paper sheets (3M). Panels were rinsed with tap water and carefully patted dry with a paper towel. The 20 gloss was measured (using the same glossmeter as that used for the 20° gloss measurement) at three places on the marred area (the ends and the center). The average of these three readings was recorded as the mar gloss. Mar resistance was calculated and recorded using the following equation:

(Marred Gloss/Initial Gloss)×100

Higher values are desirable.

Water spot resistance was measured by placing six droplets of tap water on the cured coating surface and baked for 30 minutes at 60° C. (140° F.). After baking, the panels were washed with soap and water, rinsed, dried and rated. The water spot is rated on a scale of (0 to 6), with 0 being excellent, i.e., no etch marking at all. (Technical Solventbase QWI-16).

Acid spot resistance was measured by placing a droplet of a 0.6N hydrochloric acid solution and a droplet of 0.6N sulfuric acid solution on the cured coating surface and baking for 30 minutes at 49° C. (120° F.). After baking, the panels were washed immediately with soap and water, rinsed, dried and rated. The acid spot is rated on a scale of (0 to 6), with o being excellent, i.e. no etch marking at all (Technical Solventbase QWI-1).

Adhesion and Chip—To test for recoat adhesion and recoat chip, an original basecoated and clearcoated panel was given another layer of basecoat and clearcoat The original basecoat/clearcoat film was baked for 60 minutes at 155° C., (310° F.) then allowed to cool for at least 30 minutes. The, panel was then coated with a basecoatand a clearcoat, and baked for 17 minutes at 135° C. (275° F.) After baking, the panel was aged for a minimum of 2 hours, then cut in two halves. On one half the recoat adhesion test was performed using a Cross-Cut Tester (Byk-Chemie, Wesel, Germany) by cutting through the film to the substrate in one steady motion. A second cut was made, perpendicular to and centered on the first cut. Then the panel was wiped dry with a paper towel and a lap of tape (Scotch Brand 800, 3M) was placed and rubbed firmly over the grid. The tape was removed in a rapid upward motion.

Adhesion—The recoat adhesion was rated on a scale of (0% to 100%), with. 100% indicating that no paint was removed, all edges are completely smooth, and all lattice squares are intact.

Chip—Recoat chip was performed on the other half of the panel by initially placing the panel in a Kopalk walk in freezer for a minimum of 4 hours before chipping. The panel was chipped using a Multi Test Gravelometer, Model MTG (Q Panel Lab Products, Cleveland, Ohio). The panel was placed in the gravelometer at 00 degree angle, the air pressure was adjusted at 70±0.2 PSI and the panels were shot with three, pints of gravel. The recoat chip was rated first for chip size on a scale of (A to D) with A indicating chips less than 1 mm, B indicating chips of 1–3 mm, C indicating chips of 3–6 mm, and D indicating chips greater than 6 mm. Also, chip quantity was rated on a scale of 0 to 9 with 9 being excellent, i.e. no more than 1 chip and 6 indicating 10–24 chips. The chip is reported as (recoat chip)(chip quantity).

Sag—Sag resistance was tested on a 4"×18" panel with pre-cut holes, onto which was sprayed the basecoat followed by a wedge of clearcoat such that the film thickness covered a range of approximately 0.5 to 2.5 mils. The clearcoat was allowed to air flash at ambient temperature for 5 minutes in a vertical position and then baked for 30 minutes at 141° C., (285° F.) in a vertical position. The sag resistance was rated by measuring the film build at the point at which the clearcoat has sagged below the hole for approximately 0.5–1 cm.

Pop—Pop resistance was tested on a 4"×18" panel onto which was sprayed the basecoat followed by a wedge of clearcoat, such that the film thickness covered a range of approximately 0.5 to 2.5 mils. The clearcoat was allowed to air flash at ambient temperature for a maximum of 30 seconds in a horizontal position and then baked for 30 minutes at 155° C. (310° F.) in a horizontal position. The pop resistance was rated by measuring the film build at the threshold point of pop. The point of pop is where the solvent blisters are distinctly apparent across the width of the cured panel.

VOC—The determination of the volatile organic compound content (VOC) of each sample was done using (ASTM D3960).

TABLE 46

| Test | Coating | | | |
|---|---|---|---|---|
|  | Ex. R | Ex. S | Ex. T | Ex. U |
| Total Solids (wt. %) | 45.8 | 48.7 | 44.7 | 41.7 |
| VOC (wt. %) | 4.5 | 4.3 | 4.6 | 4.8 |
| 20° Gloss | 88.6 | 88.6 | 88.8 | 89.3 |
| Mar | 90.3 | 92.2 | 91.8 | 90.6 |
| Water Spot | 3 | 3 | 2.5 | 3 |
| Acid Spot | 2/5.5 | 1/5.5 | 1.5/5.5 | 1/5.5 |
| Chip | B6 | B6 | B6 | B5 |
| Adhesion | 100% | 100% | 100% | 100% |
| Sag | 1.52 | 1.7 | 1.56 | 1.62 |
| Pop | 0.45 | <0.6 | 1.44 | 1.19 |

The data demonstrate that good coating properties that result when the coating composition of the present invention is used in an aminoplast crosslinked basecoat system.

EXAMPLE 15

A blocked isocyanate crosslinker was prepared as described in below from the ingredients in Table 47.

TABLE 47

| Ingredients | Parts by Weight (in grams) |
|---|---|
| Isophorone Diisocyanate | 1110.0 |
| Methylisobutyl ketone | 160.0 |
| Dibutyltin dilaurate | 1.0 |
| Trimethylolpropane | 156.4 |
| Caprolactam | 735.8 |
| Propylene glycol | 7.6 |
| Methylisobutyl ketone | 280.0 |

Isophorone diisocyanate, dibutyltin dilaurate, and methylisobutyl ketone were charged to a reactor and a temperature of 25° C. was established. The trimethylolpropane was added to the reactor in two equal parts. Upon addition of the first charge of trimethylolpropane, the temperature increased to 50° C. After completion of the second trimethylolpropane addition, the temperature increased to 96° C. The reactor was then cooled to 80° C. The caprolactam was then added in two portions. After holding the reaction for two hours at 110° C., the propylene glycol was added and the reaction was held until infrared analysis indicated the absence of isocyanate. After the isocyanate was consumed, the second addition of methylisobutyl ketone was made.

A thermoset electrodepositable sulfonium functional diisobutylene/acrylic resin was prepared as described below from the ingredients in Table 48.

TABLE 48

| Ingredients | Parts by Weight (in grams) |
|---|---|
| Acrylic-diisobutylene polymer of Example 8-DD | 1310.0 |
| Thiodiethanol | 366.0 |
| Lactic Acid | 81.8 |

TABLE 48-continued

| Ingredients | Parts by Weight (in grams) |
| --- | --- |
| Urethane Crosslinker described above | 662.5 |
| Deionized Water | 54.0 |
| Deionized Water | 1784.2 |
| Deionized Water | 1353.5 |

The diisobutylene-acrylic polymer was charged to a reaction vessel and heated to 80° C. Thiodiethanol, the first charge of deionized water, and lactic acid were then added to the reaction vessel. The reaction mixture was then held at 80° C. for 5 hours. At this point, urethane crosslinker was added to the reactor. After mixing for 15 minutes, the resin was dispersed into the second charge of deionized water which was at 25° C. After mixing for 30 minutes, the dispersion was reduced to its final solids with the third charge of deionized water. The dispersion had a non-volatile content of 20.3%.

An electrodepositable coating composition, in the form of an electrodeposition bath, was prepared as described below from the ingredients in Table 49.

TABLE 49

| Ingredient | Parts by weight |
| --- | --- |
| Electrodepositable resin of described in Table 48 | 1079.4 |
| CA926[30] | 5.3 |
| Deionized water | 1115.3 |
| n-hexylethylene glycol[31] | 22.0 |

[30]A catalyst paste available from PPG Industries, Inc.
[31]HEXYL CELLOSOLVE ® solvent available from Dow Chemical Co.

The resin described in Table 48 was reduced with approximately 500 grams of deionized water in a 2500 milliliter glass beaker and was agitated thoroughly using a magnetic stirrer and stir bar. The CA-926 catalyst paste was reduced with approximately 100 grams of deionized water and stirred thoroughly. This mixture was then added to the resin/water blend while under agitation. The, remaining water was then added to the paint bath followed by the slow addition of the HEXYL CELLOSOLVE. The resulting paint bath had a pH of 4.95 and a conductivity of 570 microsiemens. The paint bath was allowed to stir overnight prior to electrodeposition.

Testing of Electrodepositable Coating Composition

The electrodepositable coating composition was applied over a 4"×12" zinc phosphated cold rolled steel panel available as APR 10739 from ACT Laboratories, Inc., Hillsdale, Mich. Prior to coat out the bath composition was heated to a temperature of 110° F. Electrodeposition was carried out at 50 volts for 120 seconds. The panel was then cured for 30 minutes at 350° F. These conditions yielded 0.57 mils of film. Film cure was tested by rubbing the coated panels with an acetone soaked rag. Following 100 acetone double rubs (back and forth) there was no noticeable effect on the coated film, indicating good cure.

EXAMPLE 16

This example demonstrates resistance to surface contamination when the present isobutylene type copolymers are used in a thermoset clearcoat composition.

A commercial, solvent-borne, thermoset clearcoat (OFDCT 8000, available from PPG Industries) was treated with 3% of the polymer of example 8-AA. The polymer was incorporated by thorough mixing into a sample of the commercially produced clear coat.

Commercially available electrocoated 4"×12" steel panels were spot contaminated with 0.1 to 0.2 microgram, quantities of a series of polymers with varying surface tension. The two samples of the treated and one untreated clear coats were spray applied onto identically spot contaminated test panels. The clearcoat was applied in two coats with a sixty second flash in between, flashed for 10 minutes at ambient conditions and baked for 30 minutes at 285° F. The dry film thicknesses were 1.6–1.8 mils.

The ability of each clear coat to cover each of the contaminant polymers without leaving a visible defect has been correlated to its crater resistance. Each contaminant spot was rated against a set of arbitrarily defined standards. Typical ratings for each clear coat, with 100 as a perfect score, are as follows:

| | Rating |
| --- | --- |
| OFDCT 8000 untreated | 57 |
| FDCT 8000 + 3% additive | 89 |

Recoat adhesion was equal for the treated and untreated clear coats.

EXAMPLE 17

This example demonstrates resistance to surface contamination when the present isobutylene type copolymers are used in a thermoset clearcoat composition.

A commercial, solvent-borne, thermoset clearcoat (DC5001, available from PPG Industries) was treated with 3% of the polymer of example 8-BB. The polymer was incorporated by thorough mixing into a sample of commercially produced clear coat.

Commercially available electrocoated 4"×12" steel panels were spot contaminated with 0.1 to 0.2 microgram quantities of a series of polymers with varying surface tension. Two treated and one untreated clear coats were spray applied onto identically spot contaminated test panels. The clearcoat was applied in two coats with a sixty second flash in between, flashed for 10 minutes at ambient and baked for 30 minutes at 285° F. Dry film thicknesses were 1.6–1.8 mils.

The ability of each clear coat to cover each of the contaminant polymers without leaving a visible defect has been correlated to its crater resistance. Each contaminant spot was rated against a set of arbitrarily defined standards. Typical ratings for each clear coat, with 100 as a perfect score, are as follows:

| | Rating |
| --- | --- |
| DC5001 untreated | 58 |
| DC5001 + 3% additive | 72 |

Recoat adhesion was equal for the treated and untreated clear coats.

EXAMPLE 18

This example demonstrates the use of the present isobutylene type copolymers in a powder coating formulation, which is a grindable solid that forms a cured film when baked. The powder coating composition was prepared using the ingredients shown in Table 50.

TABLE 50

| Materials | Example V (g) |
| --- | --- |
| Polymer of example 8-CC | 7.0 |
| Hydroxy alkylamide[32] | 4.7 |
| Degasser[33] | 0.1 |
| Flow Agent[34] | 0.1 |

[32]Primid QM-1260, EMS Primid, Sumpter, S.C.
[33]Benzoin, Ura Flow B, Estron Chemical, Calvert City, KY.
[34]Resiflow PL-200, Monsanto.

Each component was mixed sequentially in a container. The mixture was then poured onto a heated 175° C. hot plate and stirred with a spatula until fluid. The mixture was then placed into a container and allowed to cool. Once cooled, it was ground into a fine powder using a mortar and pestle. The test substrate was ACT cold roll steel panels, 10.16 cm×30.48 cm (4"×12") available as APR10433 from ACT Laboratories, Inc., Hillsdale, Mich. The powder coating was dusted onto the surface of the steel: panel which was placed on the 175° C. hot plate. As the powder began to flow, a straight edge was used to draw down the coating to cover the surface of the panel. The panel was then place into a 375° F. oven for 30 minutes and cured.

Gel point determination was measured on the powder coating as it was heated on the surface of a 175° C. hot plate. Time is measured from the point when the powder melts to the point it gels, i.e., forms a solid. The time is measured in minutes and seconds. When a powder starts to cure, it will begin to string. The flat part of the tongue depressor is pushed into the molten powder and pulled upward, roughly every 15 seconds until the melt no longer strings and the timer is stopped. This is the gel point determination. A shorter period of time to reach a gel point is preferred.

Methyl ethyl ketone (MEK) rub solvent resistance was used to determine the cure of the paint. Cheesecloth was moistened with MEK and, with moderate pressure, at a rate of about 1 double rub per second, rubbed over the painted panel until the coating becomes damaged. This test is typically run to 100 double rubs or failure of the coating, which ever occurs first. The higher the number of rubs, the better the cure of the coating. Table 51 shows the test results.

TABLE 51

| | Example V |
| --- | --- |
| Gel Point | 30 Seconds |
| Mek double rubs | >100 |

The results demonstrate the good results achieved when the present isobutylene type copolymers are used in a, powder coating formulation.

EXAMPLE 19

This example demonstrates the generally poor results observed when poly(isobutylene-alt maleic acid) type polymers are formulated into a clearcoat system. The maleic acid polymer was prepared using the ingredients shown in Table 52.

TABLE 52

| | Ingredients | Parts by weight (grams) |
| --- | --- | --- |
| Charge 1 | Poly (isobutylene-alt-maleic anhydride)[35] | 200.00 |
| Charge 2 | M-pyrol | 400.00 |
| Charge 3 | DiH2O | 54.00 |

[35]Mw ca. 60.000, Aldrich Chemical Company, Milwaukee, WI

Charges 1 and 2 were mixed until completely dissolved. Then Charge 3 was added and the mixture heated to 90° C. and held for 7 hours. The reactor was then cooled to 25° C. The solids of the resulting polymer were 45.6% determined at 110° C. for one hour. The resin had an acid value of 115.35.

A clearcoat was formulated by sequentially mixing each component in Table 53 with agitation.

TABLE 53

| Materials | Example X | Example Y |
| --- | --- | --- |
| Methyl N-Amyl Ketone | 25 | |
| Butyl Ether Diethylene Glycol Acetate | 5.0 | |
| N-Amyl Alcohol | 4.1 | |
| Methanol | | 32.0 |
| GMA Acrylic Resin[35] | 87.89 | 86.1 |
| Acid Functional Crosslinker[36] | 63.69 | |
| Poly (isobutylene-alt maleic acid) | | 97.84 |

[35]50% glycidyl methacrylate, 0.2% methyl methacrylate, 7% styrene, 2.0% diphenyl-2, 4; methyl-4; pentene-1, 40.8% n-butyl methacrylate, 66% solids in 8/74/18 w/w odorless mineral spirits/Aromatic 100/methyl ether propylene glycol acetate.
[36]83/17 w/w methylhexahydrophthalic anhydride/pentaerythritol, 68% solids in 51/49w/w n-propanol/n-amyl propionate.

The test substrate was ACT cold roll steel panels 10.16 cm×30.48 cm (4"×12") available as APR28215 from ACT Laboratories, Inc., Hillsdale, Mich. The clear coating compositions of examples X and Y were applied to the panels at ambient temperature using an 8-path Wet Film Applicator, #14 available from Paul N. Gardner Company, Inc. Dry film thickness was targeted for about 30 micrometers, 1.6 mils., Panels prepared from each coating were baked for 30 minutes at 141° C.

MEK rub solvent resistance, as described in example 18 was used to evaluate the cure of the paint. The results are shown in Table 54.

TABLE 54

| | Comparative X | Example Y |
| --- | --- | --- |
| Mek Double Rubs | 20 | 1 |

The results show the generally inferior results that are found when a difunctional acid acceptor monomer, such as maleic acid is used as a comonomer with isobutylene type acceptor monomers and formulated into a clearcoat system.

EXAMPLE 20

This example demonstrates the effect of diisobutylene content on the solids level, VOC content and crater resistance in a melamine crosslinked solventborne clearcoat system.

Each component in Table 55 was mixed sequentially with agitation. The final viscosity was adjusted with 1/1/1 w/w Aromatic 100 (ExxonMobil)/methyl n-amyl ketone/xylene and 4/1 w/w methyl n-amyl ketone/2-butoxy ethanol acetate to 27 seconds measured on a #4 Ford cup (Paul N. Gardner Company) at room temperature (71°–72° F.).

TABLE 55

| Material | Ex Z (g) | Ex AA (g) | Ex BB (g) | Ex CC (g) | Ex DD (g) | Ex EE (g) |
|---|---|---|---|---|---|---|
| MAK | 7.3 | 7.3 | 7.3 | 7.3 | 7.3 | 7.3 |
| Xylene | 2.2 | 2.2 | 2.2 | 2.2 | 2.2 | 2.2 |
| Aromatic 100[11] | 7.5 | 7.5 | 7.5 | 7.5 | 7.5 | 7.5 |
| EGMHE | 0.7 | 0.7 | 0.7 | 0.7 | 0.7 | 0.7 |
| Ethanol | 3.3 | 3.3 | 3.3 | 3.3 | 3.3 | 3.3 |
| Amino Resin[12] | 49.9 | | | | | |
| Amino Resin[13] | | 40.0 | 40.0 | 40.0 | 40.0 | 40.0 |
| Acrylic Resin** | 73.8 | | | | | |
| Polymer of Example 6-P | | 78.5 | | | | |
| Polymer of Example 6-Q | | | 62.1 | | | |
| Polymer of Example 6-R | | | | 64.8 | | |
| Polymer of Example 6-S | | | | | 67.1 | |
| Polymer of Example 6-T | | | | | | 78.5 |
| Catalyst[14] | 1.0 | 1.4 | 1.4 | 1.4 | 1.4 | 1.4 |
| Aromatic 100[11] | 6.0 | 0.0 | 6.0 | 2.6 | 3.0 | 0.0 |
| MAK | 6.0 | 0.0 | 6.0 | 2.6 | 3.0 | 0.0 |
| Xylene | 6.0 | 0.0 | 6.0 | 2.6 | 3.0 | 0.0 |
| MAK | 14.4 | 0.0 | 14.4 | 6.4 | 7.2 | 0.0 |
| 2-Butoxy ethanol acetate | 3.6 | 0.0 | 3.6 | 1.6 | 1.8 | 0.0 |

**Prepared in 10/46/44 w/w isobutyl alcohol/Aromatic 100/xylene using 2,2'-azobis-(2-methyl butyronitrole) (Vazo-67, DuPont). Monomer composition m/m 40% HPA, 1.0% MMA, 19% NBA, 18% NBMA, 20% Styr, 2% AA; 71 wt. % polymer solids.
[11]Exxon Mobile Corp., Fairfax, VA
[12]Resimene ® 757, Solutia, St. Louis. MO
[13]Resimene ® 755, Solutia
[14]Cycat ® Catalyst 600, Cytec Industries(dodecylbenzyl sulfonic acid)

The clear coating compositions shown in Table 55 were applied using an 8-path. Wet Film Applicator, #14 available from Paul N. Gardner Company, Inc., to black electrodeposition primed panels (cold rolled steel panels 4"×12", available as APR28215 from ACT Laboratories, Inc.) at ambient temperature. The dry film thickness was targeted for about 30 m (1.6 mils). The coated panels were baked for 30 minutes at 141° C.

Physical properties were measured as follows:

Percent solids according to ASTM Test Method D 2369;

20° Gloss as outlined in example 10;

Distinction of Image (DOI) as outlined in example 10;

Volatile Organic Compound (VOC) content as outlined in ASTM Test Method D3960; and Craters was determined as outlined in example 11. The results are shown in Table 56.

TABLE 56

| | Coating | | | | | |
|---|---|---|---|---|---|---|
| Test | Ex Z | Ex AA | Ex BB | Ex CC | Ex DD | Ex EE |
| Percent solids | 51.4 | 63.1 | 55.9 | 59.2 | 61.6 | 63.9 |
| 20° Gloss | 92.2 | 86.6 | 86.6 | 87.0 | 86.7 | 85.9 |
| DOI | 96 | 96 | 96 | 96 | 96 | 95 |
| VOC | 4.0 | 3.2 | 3.6 | 3.3 | 3.2 | 3.0 |
| Craters | 1.0 | 55 | 60 | 76 | 82 | 85 |

The data demonstrate that increasing diisobutylene content generally improves percent solids (higher), VOC (lower) and crater resistance while not adversely affecting other properties.

EXAMPLE 21

This example demonstrates the effect of including other acceptor monomers in the present isobutylene containing copolymers on the properties of a melamine crosslinked solventborne clearcoat system containing them.

Each component in Table 57 was mixed sequentially with agitation. The final viscosity was adjusted with 1/1/1 w/w Aromatic 100 (ExxonMobil)/methyl n-amyl ketone/xylene and 4/1 w/w methyl n-amyl ketone/2-butoxy ethanol acetate to 27 seconds measured on a #4 Ford cup (Paul N. Gardner Company) at room temperature (71°–72° F.).

TABLE 57

| Material | Ex FF (g) | Ex GG (g) | Ex HH (g) | Ex II (g) | Ex JJ (g) | Ex KK (g) | Ex LL (g) |
|---|---|---|---|---|---|---|---|
| MAK | 7.3 | 7.3 | 7.3 | 7.3 | 7.3 | 7.3 | 7.3 |
| Xylene | 2.2 | 2.2 | 2.2 | 2.2 | 2.2 | 2.2 | 2.2 |
| Aromatic 100[11] | 7.5 | 7.5 | 7.5 | 7.5 | 7.5 | 7.5 | 7.5 |
| EGMHE | 0.7 | 0.7 | 0.7 | 0.7 | 0.7 | 0.7 | 0.7 |
| Ethanol | 3.3 | 3.3 | 3.3 | 3.3 | 3.3 | 3.3 | 3.3 |
| Amino Resin[12] | 49.9 | | | | | | |
| Amino Resin[13] | | 40.0 | 40.0 | 40.0 | 40.0 | 40.0 | 40.0 |
| Acrylic Resin** | 73.8 | | | | | | |
| Polymer of Example 7-U | | 72.6 | | | | | |
| Polymer of Example 7-V | | | 72.4 | | | | |
| Polymer of Example 7-W | | | | 73.9 | | | |

TABLE 57-continued

| Material | Ex FF (g) | Ex GG (g) | Ex HH (g) | Ex II (g) | Ex JJ (g) | Ex KK (g) | Ex LL (g) |
|---|---|---|---|---|---|---|---|
| Polymer of Example 7-X | | | | | 72.3 | | |
| Polymer of Example 7-Y | | | | | | 66.0 | |
| Polymer of Example 7-Z | | | | | | | 76.5 |
| Catalyst[14] | 1.0 | 1.4 | 1.4 | 1.4 | 1.3 | 1.3 | 1.4 |
| Aromatic 100[11] | 6.0 | 1.7 | 2.7 | 2.0 | 2.7 | 9.2 | 9.7 |
| MAK | 6.0 | 1.7 | 2.7 | 2.0 | 2.7 | 9.2 | 9.7 |
| Xylene | 6.0 | 1.7 | 2.7 | 2.0 | 2.7 | 9.2 | 9.7 |
| MAK | 14.4 | 4.0 | 6.4 | 4.8 | 6.4 | 22.1 | 23.2 |
| 2-Butoxy ethanol acetate | 3.6 | 1.0 | 1.6 | 1.2 | 1.6 | 5.5 | 5.8 |

**Prepared in 10/46/44 w/w isobutyl alcohol/Aromatic 100/xylene using 2,2'-azobis-(2-methyl butyronitrole) (Vazo-67, DuPont). Monomer composition m/m 40% HPA, 1.0% MMA, 19% NBA, 18% NBMA, 20% Styr, 2% AA; 71 wt. % polymer solids.
[11]Exxon Mobile Corp., Fairfax, VA
[13]Resimene ® 757, Solutia, St. Louis. MO
[13]Resimene ® 755, Solutia
[14]Cycat ® Catalyst 600, Cytec Industries(dodecylbenzyl sulfonic acid)

The clear coating compositions shown in Table 58 were applied using an 8-path Wet Film Applicator, #14 available from Paul N. Gardner Company, Inc., to black electrodeposition primed panels (cold rolled steel panels 4"×12", available as APR28215 from ACT Laboratories, Inc.) at ambient temperature. The dry film thickness was targeted for about 30 μm (1.6 mils). The coated panels were baked for 30 minutes at 141° C.

Physical properties were measured as follows:
Percent solids according to ASTM Test Method D 2369;
20° Gloss as outlined in example 10;
Distinction of Image (DOI) as outlined in example 10;
Volitile Organic Compound (VOC) content as outlined in ASTM Test Method D3960; and
Craters was determined as outlined in example 11. The results are shown in Table 58.

TABLE 58

| | Coating | | | | | | |
|---|---|---|---|---|---|---|---|
| Test | Ex FF | Ex GG | Ex HH | Ex II | Ex JJ | Ex KK | Ex LL |
| % solids | 51.4 | 61.2 | 60.6 | 61.0 | 59.2 | 49.3 | 49.3 |
| 20° Gloss | 92 | 85 | 86 | 87 | 89 | 82 | 86 |
| DOI | 96 | 96 | 96 | 96 | 95 | 89 | 94 |
| Craters | 1 | 77 | 75 | 77 | 52 | 74 | 70 |

The data demonstrate that when other acceptor monomers are included in the present isobutylene containing copolymers, acceptable melamine crosslinked solventborne clearcoat coating compositions and coatings result, with improved crater resistance.

The present invention has been described with reference to specific details of particular embodiments thereof. It is not intended that such details be regarded as limitations upon the scope of the invention except insofar as and to the extent that they are included in the accompanying claims.

We claim:

1. A multi-component composite coating composition comprising:
   (a) a base coat deposited from a pigmented film-forming composition; and
   (b) a transparent top coat applied over said base coat, wherein said transparent top coat is deposited from a clear film-forming thermosetting composition comprising:
      (i) a copolymer composition comprising segments comprised of alternating residues derived from a donor monomer composition comprising one or more monomers selected from the group consisting of isobutylene, diisobutylene, dipentene, isoprenol, and an acceptor monomer composition comprising acrylic monomers, and monomers containing functional groups, wherein said copolymer composition is substantially free of transition metals, Lewis acids, maleate-type monomer residues, and fumarate-type monomer residues; and
      (ii) a crosslinking agent having at least two functional groups that are reactive with the functional groups of the copolymer in (i).

2. The multi-component composite coating composition of claim 1, wherein the clear thermosetting composition is a liquid solution mixture of (i) and (ii).

3. The multi-component composite coating composition of claim 1, wherein the clear thermosetting composition is a solid particulate mixture of (i) and (ii).

4. A substrate coated with the multi-component composite coating composition of claim 1.

5. A multi-component composite coating composition comprising:
   (a) a primer coat deposited by electrocoating a conductive substrate serving as a cathode in an electrical circuit comprising said cathode and an anode, said cathode and anode being immersed in an aqueous electrocoating composition, comprising passing electric current between said cathode and anode to cause deposition of the electrocoating composition on the substrate as a substantially continuous film;
   (b) a base coat deposited from a pigmented film-forming composition; and (c) a transparent top coat applied over said base coat, wherein said transparent top coat is deposited from a clear film-forming thermosetting composition comprising:
  (i) a copolymer composition comprising segments comprised of alternating residues derived from a donor monomer composition comprising one or more monomers selected from the group consisting of isobutylene, diisobutylene, dipentene, isoprenol, and an acceptor monomer composition comprising acrylic monomers, and monomers containing functional groups, wherein said copolymer composition is substantially free of transition metals, Lewis acids, maleate-type monomer residues, and fumarate-type monomer residues; and
  (ii) a crosslinking agent having at least two functional groups that are reactive with the functional groups of the copolymer in (i).

6. The multi-component composite coating composition of claim 5, wherein the clear thermosetting composition is a liquid solution mixture of (i) and (ii).

7. The multi-component composite coating composition of claim 5, wherein the clear thermosetting composition is a solid particulate mixture of (i) and (ii).

8. A substrate coated with the multi-component composite coating composition of claim 5.

* * * * *